(12) United States Patent
Nelson et al.

(10) Patent No.: US 6,811,632 B2
(45) Date of Patent: Nov. 2, 2004

(54) FRICTION STIR WELDING OF POLYMERIC MATERIALS

(75) Inventors: Tracy Wendell Nelson, Provo, UT (US); Carl David Sorenson, Provo, UT (US); Clark Joseph Johns, Columbia, TN (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 10/275,412

(22) PCT Filed: May 4, 2001

(86) PCT No.: PCT/US01/14501

§ 371 (c)(1),
(2), (4) Date: Apr. 28, 2003

(87) PCT Pub. No.: WO01/85383

PCT Pub. Date: Nov. 15, 2001

(65) Prior Publication Data

US 2003/0205565 A1 Nov. 6, 2003

Related U.S. Application Data

(60) Provisional application No. 60/202,516, filed on May 5, 2000.

(51) Int. Cl.[7] ............................................... B29C 65/06

(52) U.S. Cl. ....................... 156/73.5; 156/73.1; 156/82; 156/272.2; 156/379.6; 156/497; 156/498; 156/499; 156/580

(58) Field of Search ....................... 156/64, 73.1, 73.5, 156/82, 272.2, 359, 379.6, 497, 498, 499, 580, 581, 583.1; 228/112.1, 2.1

(56) References Cited

U.S. PATENT DOCUMENTS

| 4,514,242 A | * | 4/1985 | MacLaughlin et al. | ..... 156/73.5 |
| 5,460,317 A | * | 10/1995 | Thomas et al. | .......... 228/112.1 |
| 6,053,391 A | * | 4/2000 | Heideman et al. | ........... 228/2.1 |

* cited by examiner

Primary Examiner—James Sells
(74) Attorney, Agent, or Firm—James L. Sonntag

(57) ABSTRACT

A method and apparatus for welding thermoplastic materials with a stir welding system using a rotating element pin or element with a geometry to induce frictional energy from the rotating element. A floating constraining surface that has a motion independent of the rotation the pin (preferably stationary) is used to constrain ejection of material from the zone where the weld is being formed. Molten material is retained in the weld region, avoiding weakness and voids at the weld joint. Optionally a system for introducing thermal energy into the weld zone in addition to the frictional energy is used. The system for introducing the thermal energy may be in association with the constraining shoe and/or the rotating tool, or a system independent of these.

65 Claims, 17 Drawing Sheets

FRICTION STIR WELDING OF POLYMERIC MATERIALS

RELATED APPLICATIONS

This application is an application filed under 35 U.S.C. § 371 from PCT/US01/14501, filed May 4, 2001, which claims priority from U.S. Provisional Patent No. 60/202516, filed 5 May 2000.

FIELD OF THE INVENTION

This invention relates to a method and apparatus of joining of thermoplastic materials.

BACKGROUND OF THE INVENTION

While metals are currently being used for many applications, and new metal alloys are being developed, more parts are being designed and manufactured using plastic and composite materials. Likewise, existing parts that are currently made with metals, are being redesigned and manufactured with plastic materials.

Plastics offer several advantages over metals. Engineering plastics have a higher strength to weight ratio than many metals. As a result, they require less energy to move due to decreased inertia, which results in energy savings and faster moving parts. Likewise, while most metals are isotropic, composite materials can be designed to be anisotropic. This allows designers to use less material in unloaded areas while strategically placing material in areas under high loads and stresses resulting in even higher strength to weight ratios.

Plastics are tough, viscoelastic materials. Because of this, most plastics can undergo high amounts of deformation before yielding. Durability is a definite strength when dealing with plastics.

Plastics are more resistant to the environment than most other classes of materials. This is why many chemical containers are made of plastics because they are chemical resistant, lightweight, and will not break if dropped. Fillers and additives, such as chlorine and UV stabilizers, can be added to raw plastic materials to improve their environmental resistance.

Plastics are also easily processed. Thermoplastic materials must simply be melted, molded into a desired shape, and then allowed to cool. Injection molding is a simple process that has revolutionized several industries by making it possible to produce complex parts in large volumes, at low cost. Costs are reduced further as scrap material can be easily recycled, sometimes even as part of the production process.

Despite the continuous improvements and development of new plastic materials, the processes used to fabricate final products are often inadequate.

One of the areas undergoing the greatest advances in the past few years is the area of joining processes. While, several new processes have been developed to meet the need for producing large volumes of quality plastic parts, there is still a need for a process for joining plastic materials, particularly for structural and high performance applications. Unfortunately, plastics can be difficult to join due to their low surface energies, poor wetability, and the presence of release agents from previous processing steps. A good joining method should be able to meet basic requirements. These requirements may include:

1. Reproducibility of joint efficiency
2. Ability to join materials in various joint geometries
3. Suitability for small and large bonding areas
4. Minimal surface preparation required
5. Minimal use of expensive specialty equipment
6. Potential for production applications
7. Retention of joint integrity in a variety of environments and load systems Modern joining methods address these process requirements in a variety of ways. Modern joining methods fall into two general categories: mechanical fastening and bonding. Mechanical fastening utilizes a separate, mechanical device that holds the materials together at the joint area. Bonding joins parts through adhesives or fusion (welding). Adhesive bonding includes the use of adhesives or solvents to chemically join parts. Welding includes thermal, friction/mechanical, and electromagnetic methods that melt or soften to fuse the material together at the joint. While all of these methods have advantages in joining plastics, and all have been used successfully in commercial applications, there is still a need for a method for joining plastics. As discussed in greater detail below, existing methods still are deficient for the joining the plastics.

Mechanical Fastening

Mechanical fastening involves attaching or joining parts by using external materials or components to mechanically hold the plastic parts together. Screws, rivets, clips, and brackets are some examples of mechanical fasteners, which can be metal or plastic, depending on the application. A disadvantage of mechanical fasteners is the concentration of stresses that develop at the localized fastening areas. Although straightforward and relatively simple to form, mechanically fastened joints are typically of low performance, when compared with other methods Adhesive Bonding Adhesives Adhesive bonding is a mature process. Adhesive research is very advanced and has made the joining of virtually any material possible. Adhesives effectively join a variety of plastics, and are relatively simple, requiring neither expensive equipment nor extensive training of personnel.

Because most adhesives rely on chemical reactions between materials to effectively bond parts, there are disadvantages associated with this process. The performance of adhesive joints depends greatly on part surface preparation, especially with thermoplastics, to ensure that all release agents have been removed prior to bonding. Surface preparation and long cure times reduce the applicability potential for this process. Another disadvantage is that different materials require different adhesives to properly bond them together. The interfacial bond between the two surfaces exhibits different properties than the rest of the material due to the fact that an adhesive typically behaves differently than the base material under the same applied stresses. The chemicals used in adhesives can also present environmental and health hazards. In addition, some plastics, are relatively chemically unreactive and do not effectively react with chemically reactive adhesives.

Solvents

Solvent bonding is also effective for some plastics. After the surfaces to be joined are softened by contact with the solvent, they are held together until the molecules in the plastic interlock across the bond line and the solvent evaporates. This process is simple and inexpensive, but may require long waiting times and can cause stress cracking due to the action of the solvent on the plastic. Times required to make a strong bond can be as long as four days, which significantly slows the manufacturing process. Solvents can also be very volatile, creating safety and health hazards. In addition, some plastics, (polypropylene, polyethylene, nylon) are basically insoluble to common solvents.

Welding Processes

Welding processes are the most widely used joining processes in high production applications because they are fast and versatile. Welding requires heating and some degree of softening or melting to form a bond. Thermoplastic polymers lend themselves to these processes because they can be quickly heated, formed, and then cooled to retain a new configuration or form. However, care must be taken not to degrade the plastic parts as repeated heating or overheating will eventually result in degradation and diminished properties.

As mentioned earlier, the three general classes of welding methods are thermal, friction/mechanical, and electromagnetic. Some of the more widely used processes from each of these classes will be discussed.

Thermal Methods

Thermal methods use heat generated by the tooling to soften or melt the surfaces to be joined. Hot gas welding, extrusion welding, hot tool welding, and infrared heating are thermal methods used for welding plastics.

Hot gas welding is a well established process, as it has been used to weld plastics for over 30 years. Its name explains the process well. A heated gas is used to soften the joint surfaces and a softened filler rod is used to fill the joint area and bond the surfaces together. The gas is typically just air, but an inert gas such as nitrogen must be used with some plastics to prevent oxidation. For a butt joint, the edges to be joined are typically beveled to increase the surface area for the filler rod to fuse with. This filler rod is heated and fed into the joint, similar to many fusion welding processes used for joining metals. However, unlike metals, the work piece and filler rod are not melted; instead they are softened just enough to allow them to fuse together.

The equipment for hot gas welding is inexpensive and portable making it ideal for specialty shops, field work, and repairs. This makes hot gas welding one of the most flexible welding processes available. However, this flexibility is offset by the fact that the process parameters must be strictly controlled to ensure a good weld. If the temperature of the joint is not controlled, the material can degrade or oxidize or a weld could be incompletely formed. As a result, the success of this process is almost totally dependant on the skill of the operator, making consistency a concern. It is also quite easy to trap defects in the weld during welding, resulting in a weakened weld. Because this is a manual process, it is also quite slow and not suited for high production.

Extrusion welding is very similar to hot gas welding. However, instead of using a rigid filler rod to fill the weld, the filler material is extruded directly into the joint. Gas is still used to heat the work pieces. The hot, extruded plastic and heated joint surfaces fuse together as they cool.

Hot plate or heated tool welding is currently considered the most versatile and simplest technique for effectively joining plastics. In this process, the surfaces of the parts to be joined are pressed against a heated tool and brought to their melting point. Once the surfaces are melted, the tool is removed and the surfaces are held together under carefully controlled pressure as the plastic cools. When done properly, the weld strength can equal the strength of the base material. However, care must be taken to reduce oxidation with some plastics, especially nylon. Dissimilar materials can even be welded with hot plate welding.

Hot plate welding equipment can be either portable or fixed despite the fact that the equipment is somewhat larger than equipment used in other joining processes. The portable equipment is used for welding large diameter pipes (up to 2' in diameter) on site. Hot plate welding can join small and large thermoplastic parts.

Although hot plate welding is a forgiving process (requiring little surface preparation, even for complex geometries), there are disadvantages associated with it. Degradation and crystallization are concerns that are not fully understood, even today. Special considerations must be made concerning the tooling. The tool surfaces must be coated with a non-stick surface such as PTFE. These surface coatings limit the maximum use temperature to 500° F., making this process unsuited for use with high temperature materials. This is also a relatively slow process with weld times ranging from a few seconds for a small part to 30 minutes for a large pipe.

Friction/Mechanical Processes

Friction welding is a very fast and effective method for joining certain part and joint geometries. The heat required to soften or melt the joint surfaces results from the friction generated between the joint surfaces as they are held under pressure. Relative movement between the two surfaces generates enough friction to melt the surface in less than three seconds. These frictional processes have much shorter cycle times than other processes and the strength of the resulting welds are close to the strength of the base material. Spin, vibration or linear friction welding, orbital or angular friction welding, and ultrasonic welding are all processes that rely on heat generated by friction to join parts. These processes have very short cycle times.

Spin welding is typically used for concentric parts that do not require any angular alignment. The surfaces to be joined are held facing each other while one of the surfaces is spun in relation to the other. Once the rotating part has come up to speed, the rotational force is disengaged and the parts are pressed together. Frictional forces convert the rotational energy into heat. The joint is completed as the spinning part comes to rest, having fused with the stationary part. Because this process uses relative surface velocities to generate heat, more heat is produced on the outside edges of parts. The difference in heat generated can lead to residual stresses across the weld. For this reason, joint design is a critical process parameter. This process is best suited for welding thin-walled, hollow parts, however, care must be taken when welding such parts since flash typically forms at the weld and can be difficult to remove from the internal surfaces of parts.

For joints requiring a specific part orientation about the axis of rotation, orbital welding, also known as angular friction welding, can be used. Instead of spinning the parts as in spin welding, the parts rotate back and force in an angular displacement. In this way, the orientation of the part geometries relative to each other is always known.

Vibration welding, also known as linear friction welding, operates on the same principle as spin welding except that the displacement is linear instead of rotational. This linear displacement is very small, on the order of 0.002–0.070 inches. When at the proper heating level, the parts are aligned, pressed together, and cooled. As with the other friction welding methods, this process does not require special surface preparations.

Each of these frictional processes is very fast and effective in their applications. Frictional processes typically produce a hermetic joint, free of voids and cracks. Because this process fuses together the surfaces to be joined, the resulting welds have strengths near that of the base material, with localized heating reducing the risk of degradation. These processes require minimal setup, have no associated consumables, and require little to no post process operations. They do, however, typically require specialized equipment.

Ultrasonic welding is one of the most widely used processes despite the fact that it is a relatively new process (Bauer 75). This process utilizes high frequency vibrations between parts to create friction and conditions of hysterisis. These conditions result in enough energy input to melt the parts at the weld interface. Because the energy is localized, a weld is produced without significant melting of the base material. This process offers several advantages which include: cycle times under 1.5 seconds, good quality control, efficient energy use, no consumables or toxins, and little operator training. Few processes compare with the speed of ultrasonic welding.

There are also some disadvantages associated with this process. Ultrasonic welding is limited to lap joints and staking operations. Staking is similar in concept to riveting in the way in which it mechanically joins parts. In staking, one part must have a post or nub that passes through an opening in the second part. This post is then softened using ultrasonic energy, while pressure applied by the ultrasonic tool mushrooms out the softened post so the post cannot pass back through the opening in the second part, thus forming the mechanical joint.

Because of the high energy levels required by this process, only small welds can typically be made with ultrasonic welding. This is why spot welding and staking are the most common operations performed with this process. Multihead machines allow larger parts to be welded. For example, welds can be up to 6 inches long when done with thin materials. The resulting welds exhibit a heat-affected zone which has decreased mechanical properties similar to that observed in metals. Ultrasonic welding is most effective with amorphous polymers.

Radio frequency welding is like ultrasonic welding, in principle. It also uses high frequency vibrations to disturb the molecules of the parts to be joined. This process has a smaller heat affected zone than ultrasonic welds, because it does not generate as much localized heating. It also works best with thin materials because thick materials dissipate the vibrations too much. However, there are safety considerations for radio frequency welding methods due to operator exposure to high frequencies and types of electromagnetic radiation. Also, several plastics are resistant to the frequencies used in radio frequency welding and cannot, therefore be joined by this method.

Some processes, such as lasers welding, use neither mechanical nor frictional forces to join plastics. Lasers rely on light radiation as the source of energy necessary to melt the material at the joint. Lasers are proving to be an effective method for joining plastics. Laser welding is a non-contact process so parts do not require robust fixtures to maintain proper part orientation during welding. Lasers offer extreme flexibility and low operating costs because they require no consumables and are low maintenance. Likewise, with the use of fiber optic lasers and robotics, it is possible to follow three-dimensional surfaces; something that most processes cannot do.

There are obviously a variety of techniques to choose from when joining plastics. Each process lends itself to certain applications. Available capital, space, trained operators, weld quality, volume of product, environmental concerns, necessary process flexibility, and especially joint design all influence the process choice. Unfortunately, most of the effective welding methods require expensive, specialized equipment. A process which could utilize existing machinery while offering lower costs, increased flexibility, limited joint preparation, increased safety, and the potential for automation would meet the needs of many industries.

Metal Welding Methods

Some of the welding techniques for joining plastic are analogous to certain metal welding techniques, such as hot gas welding. According, there has been an effort to adapt metal welding techniques to plastic materials. Among the metal welding techniques is a method referred to as "friction stir welding" (FSW) was originally developed for welding aluminum alloys is disclosed in U.S. Pat. No. 5,460,317, to Thomas et al.

The Thomas et al. method comprises causing a non-consumable probe or tool to enter the joint region and generating heat between the probe and opposed portions of the joint, which causes the opposed portions to become plasticized. The probe is removed or translated along the joint allowing the opposing plasticized portions to join and solidify. The Thomas et al. method is accomplished by two distinct methods, (1), using a flatted blade that reciprocates between the opposed portions, and (2) a rotating pin or bobbin spins between the joined portions as it advances along the joint. Preferably, the plasticized material is restrained from extruding from the joint region, for example by a shoulder above the pin which closely fits the work-piece surface and rotates with the tool, which shoulder also provides a frictional surface.

More particularly, the rotating pin method (2) for welding metals comprises plunging a nonconsumable, rotating pin into the joint line of two butted metal sheets of material. While the material is held very firmly in place, the rotating pin forces frictional contact and resultant heating. The pin extends from a rounded or radiused shoulder according to the required depth of the weld. The radiused shoulder rides on the top surface of the materials, generating frictional heat and holding the weld material in the joint. The frictional heating lowers the yield or flow strength of the material, allowing the pin to advance through the material along the joint line. As the pin advances, the softened material flows around to the backside of the pin where it reconsolidates. The weld size is determined by either the pin or shoulder diameter, depending on the setup. In the present application, this version using the rotating pin is what is meant by "friction stir welding", is distinguished by the reciprocating blade welding method.

Efforts have been made to apply this method to other materials, and Thomas et al. does disclose the joining thermoplastic materials using his method, and shows examples of friction stir welding using a reciprocating blade method. However, use of the Thomas et al. friction stir welding processes with a rotating pin or bobbin have not been successful for welding plastics. The reason this method has not been successful for plastics is due largely to fundamental property differences between plastics and metal, including, the viscoelastic behavior properties, the relatively low melt temperatures of plastics, and other properties of polymeric materials. The result is usually a weld that has substantial voids from plastic material being ejected from the weld area, and a weld of low strength.

If friction stir welding could be applied to plastics, it would offer many advantages ranging from cost reductions to the ability to weld fairly complex, flat joints. Manufacturing costs would be lowered in several ways. Machine costs would be reduced because FSW would require minimal specialized equipment. A high quality vertical mill with minor modifications could be effectively used for this process. A company desiring to use this process could even convert an old mill to perform this operation. Machining mills are low maintenance, low cost, energy efficient machines. The fact that this is a machine tool operation means that the operators do not need special training in this process. Costs would be further reduced because there are no consumables. FSW would not require filler material, shielding gasses, or other consumables aside from electricity and the tools themselves. Special joint edge profiling would not be necessary and the joint surfaces would not require high tolerances or specially prepped surfaces, so prep work and setup would be minimal. Safety costs would be reduced because FSW is a safe and clean process as there is no arc emitting bright light or ozone. Similarly, there are no high voltages or gasses to worry about. Automation can further reduce costs while producing consistent high quality joints. The equipment could also be made portable, so economical field repairs could be done. The possible control and versatility associated with this process are appealing.

Objects of the Invention

It is, therefore, an object of the invention to provide a method and apparatus for friction stir welding for thermoplastic materials.

Another object of the invention is to provide a method and apparatus for welding thermoplastic materials that does not leave voids in the weld that would weaken it.

Another object of the invention is to provide a method and apparatus for welding thermoplastic materials that is applicable to multiple joint configurations.

Another object of the invention is to provide a method and apparatus for welding thermoplastic materials that is safe, not requiring potentially hazardous solvents or radiation conditions.

Another object of the invention is to provide a method and apparatus for welding thermoplastic materials that requires limited joint preparation, can be preformed by technicians with little training, and consistently produces high-quality welded joints.

Another object of the invention is to provide a method and apparatus for welding thermoplastic materials that requires no specialized machinery, or expensive tooling to perform.

Another object of the invention is to provide a method and apparatus for welding thermoplastic materials that may be automated.

Further objects of the invention will become evident in the description below.

BRIEF SUMMARY OF THE INVENTION

In has been found that friction stir welding for thermoplastics has been unsuccessful for various reasons relating the particular properties of thermoplastics. Unlike with metals, in thermoplastics the friction from a conventional rotating tool introduces insufficient energy into the thermoplastic materials to fuse the thermoplastic into a suitable joint. In the prior-art a shoulder can be provided to provide additional frictional surface and increase the input of energy, but the result is still unsatisfactory. Material in the weld region is ejected from the weld region, since the rotating shoulder functions more as an agent to eject the material than retaining the material-under shoulder. The loss of material results in a material deficient weld joint that is weak and contains voids.

It has been found that these problems in thermoplastics can be solved by two modifications to the FSW process; (1) providing a constraining surface which is stationary, or at least moves independently of the pin or rotating element, and (2) introducing energy by a system independent of the frictional energy produced by the tool.

With respect to (1) the providing a constraining surface which is stationary, or at least moves independently of the pin or rotating element, the constraining surface must have an independent movement from the pin for, as discussed above, if the surface rotates with the pin it will not constrain and inhibit ejection of the thermoplastic material. The constraining surface may be non-rotating or rotating independently of the rotating element. For example, it may be a non-rotating or slowly rotating shoe on the same or different axis from the rotating element, such as a roller moving on another axis transverse to the rotating axis of the pin. The rotating of the shoe may be in the same or in the direction opposite of the rotating element. The constraining surface also includes any suitable construction that provides the constraining function with the independent motion. This may include, for example, a roller moving on another axis transverse to the rotating axis of the pin. This construction may allow for a structure for rolling a surface over a portion of the weld forming region. The independent motion of the constraining surface is such that lateral forces are not translated into the rotating element from the constraining surface, which forces may lead to failure of the pin. In this manner the constraining surface is able to float as it is directed along the path of the rotating element, so that it does not induce lateral forces in the pin when the pin is stressed. The constraining surface can also function to assist in reconsolidation of the thermoplastic as it forms the weld behind the tool. It can also provide a surface for introduction of additional thermal energy.

With respect to (2) the introducing energy by a system independent of the frictional energy produced by the tool, the temperature in the weld region is therefore independent of the speed or rotation and travel of the tool. This allows for optimum conditions to not only provide the fusion of the thermoplastic, but also to control the flow of thermoplastic around the tool, preventing ejection, retaining thermoplastic in the weld region, and preventing voids. This also allows for a greater flexibility in design of the tool. A rotating shoulder to induce friction can be eliminated and the geometry of the tool can be designed to control the flow of the softened or melted thermoplastic, and/or to provide a surface to introduce additional frictional energy into the thermoplastic.

In an embodiment of the invention, the energy to soften the thermoplastic to a suitable fusion temperature is provided solely by the rotating and advancement of the element or pin. The geometry of the rotating element is specifically designed to produce the amount of frictional energy required to fuse the thermoplastic. The geometry may also include elements to control the flow of the softened or melted thermoplastic. In contrast to the rotating elements of the prior-art used in metal welding, the tools of the invention have geometry specifically designed to control and produce the frictional energy. This can by accomplished by any suitable geometry, preferably with a rotating element having non-circular cross-section. Such a cross-section would include any non-circular closed shape that functions to induce friction from the rotating of the element. Shapes that provide a cutting action to the thermoplastic material are preferably avoided. The non-circular cross-section may be polygonal, star-shaped, lobed, dumb-bell-shaped, ovoid, bladed, s-shaped, crossed, or a combination thereof. Illustrations of suitable rotating elements are shown in FIGS. 26A-1 to 26C-10, which show both cross-sectional and side views. Shown are non-circular shapes and pins (FIGS. 26A-1 to 26A-12, 26C-2 to 26C-8, 26C-11 to 26C-13) combined with variation or non-variation of cross-section of the shape along an axis of rotation (FIGS. 26B-1, 26B-13, 26C-9, 26C-10). The geometry of the rotating element may also include a surface with shear or friction producing protuberances, such as ridges, threads, flutes, grooves, or the like. The function of the construction is to produce frictional forces in the thermoplastic material to (input energy into the plastic material. The geometry may also have the function of controlling the flow of the thermoplastic material. For example, appropriately aligned threads may be provided to move melted or softened plastic material down into the weld from the surface. Such action tends to inhibit loss from of material form the weld region.

In an alternate embodiment, thermal energy is also introduced into the weld region by heating the weld region during the welding process. This may be accomplished, for example, by heating the constraining surface, and/or by heating the rotating tool.

The method of the present invention is suitable for welding any thermoplastic material, including many that are difficult to join by prior-art welding techniques, such as polyethylene. By "thermoplastic" material in meant herein to mean any plastic material that can be fused by heating the material. Examples include, but are not limited to, polyethylenes, polyproplylenes, ABS, nylon, PEEK, and styrene. Depending upon the properties of the thermoplastic, supplementary thermal energy in addition to the frictional energy from the rotating element may be introduced. For low melting and/or high friction materials, no supplementary thermal energy may be required. However, for higher melting thermoplastics, or for "lubricous" thermoplastics that produce inadequate friction energy (or those that tend to abrade) supplemental thermal energy may be required.

Friction stir welding of plastics according to the present invention has potential applications in almost any industry. FSW can be used to join large panels, repair faulty joints or cracked parts, to weld fuel tanks, container bodies, vessels, plastic window and door frames, to construct pipelines, to fabricate pipes, to join electrical component bodies and connectors, etc.

In summary, the present invention comprises a method and apparatus for forming welds in thermoplastic material. A rotating element is introduced onto a thermoplastic material and advances along the surface of the material on a path where the weld is to be formed. The speed of advancement and the rotational speed of the elements introduce frictional heat into the region around the element, i.e., the region where a weld is being formed, by fusing the thermoplastic material. The geometry of the rotating element is such to also introduce energy by frictional forces.

In addition to the frictional energy, thermal energy is optionally introduced into the weld-forming region from an outside energy source. The outside energy source could directly contribute thermal energy, or it could contribute some other kind of energy (e.g. mechanical or electromagnetic) that is converted to thermal energy by the material being welded. The combined friction, and outside energy introduced into the weld forming region fuses the thermoplastic material sufficiently to form a welded bond.

In addition to introducing energy by rotating the element, the element can be moved in a non-rotating movement that produces frictional energy in addition to that produced from the rotating of the element, and the advancement of the element along the path. The non-rotating movement may be vibration, oscillation, eccentric rotation, expansion, contraction, or a combination of these.

A constraining surface, such as a non-rotating shoe, bears on the surface of the thermoplastic material to contain softened or melted plastic and inhibit its expulsion form the weld forming zone from the rotational motion of the element. In addition, the constraining action of the non-rotating surface provides a forging pressure and assists in consolidation of the fusing thermoplastic after the rotating element moves on and the thermoplastic fuses and solidifies to form a welded joint. The pressure applied by the constraining surface is preferably sufficient to assist in consolidation, but insufficient to penetrate the plate into the thermoplastic material to weaken the weld. The constraining surface should be able to float with the rotating element so that it does not induce lateral forces in the element when the rotating element is stressed, particularly by lateral forces. The constraining surface can translate generally with the element as it travels down the path of the weld, but is does not rotate with the element. In this way it cannot contribute to expulsion of thermoplastic from the weld forming zone. The non-rotating surface of the constraining surface may be any suitable configuration. For example, it may be flat, not flat, cylindrically or spherically concave or convex, or dome shaped, adapted so that it will function to capture material and to apply the consolidation pressure. (See constraining surface shapes in FIG. 27A to FIG. 27E-2) In particular, there may be special geometries that are developed to affect the compression of the plastic and hence the final properties of the weld, such as the finish of the weld.

The constraining surface may be non-rotating or rotating independent of the rotating element. These include, a non-rotating or slowly rotating shoe on the same or different axis from the rotating element. The constraining surface may also include any suitable construction and provides the constraining function. This may include, for example, a roller moving on another axis transverse to the rotating axis of the pin. Suitable constructions for a constraining surface are illustrated in the examples, and in FIGS. 27A to 27E-2.

In a preferred embodiment of the invention, the additional thermal energy introduced in the thermoplastic incorporates the constraining surface, whereby the constraining surface is heated by any suitable means and heat is transferred through the contacting surfaces of the constraining surface and the thermoplastic material. The constraining surface may also be shaped to accommodate the input of the thermal energy, in any portion of the welding zone. The constraining surface may also, at least in part, be insulated to reduce the dissipation of heat from the weld region.

Alternately, the thermal heat can be introduced into the weld-forming zone by heating the rotating element.

Suitable heating methods for the constraining surface or the rotating pin include, but are not limited to, sonic heating (including ultrasonic and subsonic), resistance heating, conduits using a hot heat transfer fluid, inductive heating, and hot gasses or flames. Systems for introducing thermal energy include, but are not limited to, inductive heater, resistance heater, a gas flame, fluid heat exchanger with a heated fluid, a sonic generator, a chemical reaction, or a combination of the above.

In addition, the thermal energy source may introduce thermal heat into the welding zone by inducing thermal energy in the thermoplastic, such as through heated gas streams, ultrasonic or radio frequency waves, using any suitable method.

Thermal energy may also be removed from any portion of the weld forming region to control the temperature of the heated thermoplastic materials or assist in consolidation of the heated and fused thermoplastic material. This may be accomplished by cooling the rotating element and/or by cooling at least a portion of the constraining surface.

The piece or pieces of thermoplastic material being welded should be held firmly during the welding operation to hold adjoining pieces firmly against one another and allow the constraining surface to apply pressure. Depending upon the type of welding joint, a backing plate may be required to so that the pressure can be applied. Certain lap joints, including pipe joints, may be self-backing and do not require a backing plate because the rotating pin may only partially penetrate into the underlying piece.

BRIEF DESCRIPTION OF THE DRAWINGS

FIGS. 26A to 26C-10 are schematic diagrams of suitable geometries of the rotating element, including cross-sectional views and side views.

FIGS. 27A to 27E-3 are schematic diagrams showing constructions of suitable constraining surfaces.

DETAILED DESCRIPTION OF THE INVENTION

EXAMPLES

Plastic Material

The plastic used for the below examples was compression molded ABS.

This material was chosen for several reasons. First, it is a very common commodity thermoplastic. ABS is a blend of three plastics (acrylonitrile, butadiene, styrene) which are combined to produce a high strength, low cost, good impact resistant thermoplastic. As a result, it is used in a variety of applications, from sewer pipe to sporting goods. Second, although ABS is slightly hygroscopic, it does not need to be dried prior to processing, thus eliminating the need for extra moisture considerations during testing. Third, ABS is easy to process and readily joined by every common joining process, thus there is ample data available for comparison of the present invention and previous plastic welding methods.

For this particular example, compression molded ABS was chosen over extruded ABS for several reasons. First, with compression molding the molecular chains do not align in the "machine direction" as in extrusion, producing an anisotropic material more suitable for comparison of the methods. Likewise, compression molded sheets typically have fewer voids and cracks, resulting in more consistent data. Furthermore, a smooth surface was needed on the test specimens. Most ABS sheet material has a haircell texture that is useful in many applications, but presents hundreds of stress risers on the surface of the material during mechanical testing. Compression molded ABS sheets exhibit a smooth surface and are therefore used in this example.

Smooth compression molded ABS was procured in a 0.25" thick, 4'×8' sheet and sectioned. 4"×14" test samples were cut from the sheet and deburred to provide a good joint interface. In the experiment, the 4"×14" pieces were welded together lengthwise.

Tool Design

Several tool designs were tested. Each tool was used to make several welds and an optimal tool was chosen based on the tool life and resulting weld performance. The tools were all machined from H13 tool steel which was heat treated to an RC>40.

Prior-art Aluminum-Style Tool

Figure 1:
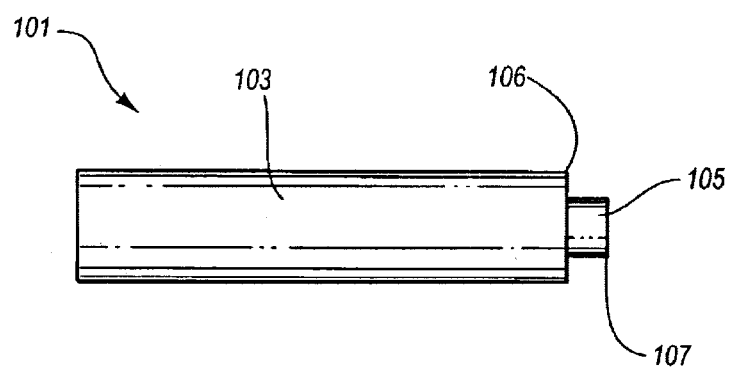
FIG. 1 is schematic of a prior-art aluminum-style tool.

The first tool design, called the aluminum-style tool, was similar to the tools used in friction stir welding aluminum. FIG. 1 is an illustration of this simple tool. These simple tools 101 look like a counterboring tool with a large diameter for the majority of its length 103 and a reduced diameter 105 at a shoulder 106, with the reduced diameter extending to the end of the tool to form a tool pin 107. This reduced diameter is the "pin" of the tool and is the portion of the tool which is introduced into the thermoplastic by plunging into the joint area. The larger diameter, referred to as the tool "shoulder," contacts the top surface of the joint area during welding. The diameter of the pin is about 0.375 inches.

Figure 2:
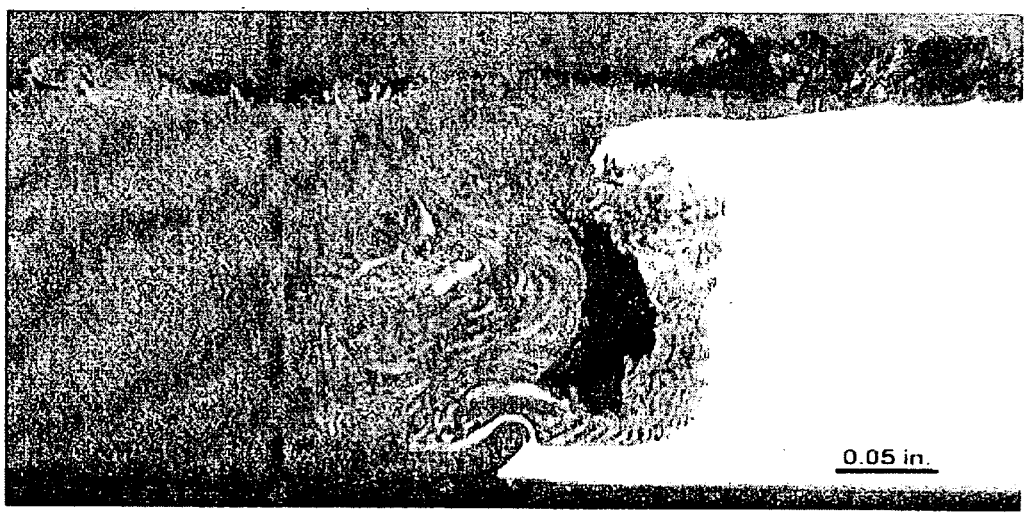
FIG. 2 is a microphotograph showing a cross section of weld done with aluminum-style tool as in FIG. 1 showing void in right side of weld.

Preliminary testing with the aluminum-style tool was run with the same procedure used for welding aluminum. This required that the milling head was tilted back 2–3° in the direction of travel for the best quality weld. Although this design resulted in reasonably good heating of the plastic due to the large contact area (the surface area of the pin and the shoulder), it resulted in excess flash around the weld as the rotating shoulder dragged plastic out of the weld area. This reduction in material in the weld area resulted in the formation of voids. FIG. 2 is a picture of a cross-section weld from an aluminum style tool, showing such a void, appearing as the black shape on the right side of the weld. Voids ran the length of the weld, severely weakening the welded joint, and were always located on the side of the weld that the leading surface of the pin turned towards.

In an attempt to reduce these defects in the weld area, the head of the mill was tilted in a manner that applied more downward force to the side of the weld that was prone to forming voids. This added pressure closed the voids somewhat, but the problem persisted. Tensile testing of the specimens showed that the weld areas for welds made with this tool had only 20% of the strength of the base material; an unacceptable value. It was also observed that the specimens failed on the void-prone side of the weld.

Spindle Shoulder Tool—Comparative

Figure 3:
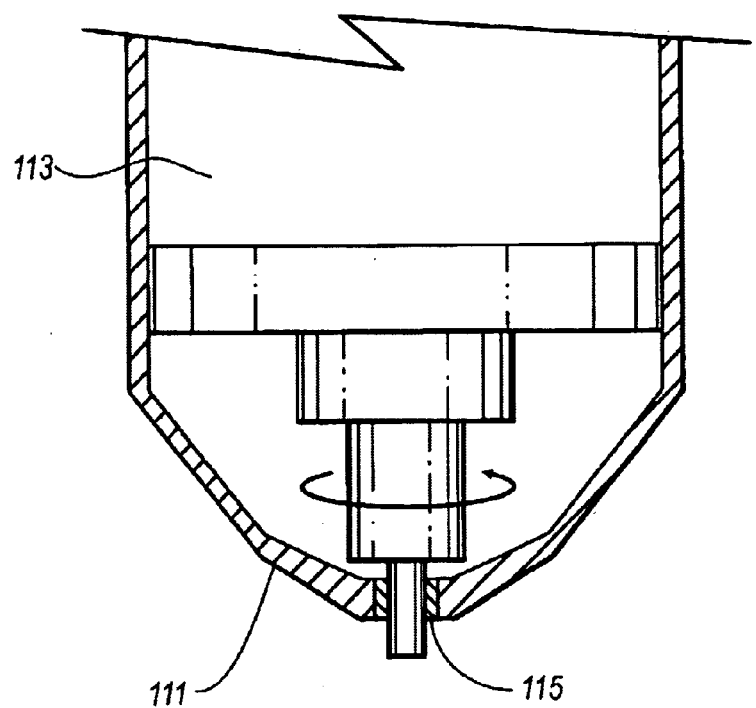
FIG. 3 is a schematic of a comparative spindle shoulder tool.

The second tool design, referred to as the "spindle shoulder" design, was designed to hold the shoulder stationary while rotating the pin in an attempt to contain the melted plastic in the weld area. This tool is illustrated in FIG. 3. The stationary shoulder 111 was designed to mount onto the spindle sleeve 113 of the mill to hold the shoulder stationary. The tool pin 114 is passed through a graphite-impregnated brass bushing 115 pressed into the tapered and radiused end of the stationary shoulder. This bushing supported the tool pin from the loads exerted on it during welding. The purpose of the stationary shoulder was to contain the melted plastic in the weld area while the pin melted and welded the plastic together.

The spindle shoulder design did not work well because the dynamic loads on the pin caused it to undergo severe cyclic fatiguing which caused the tool to break after a short time. It was determined that this design would not work in production because it was not reliable enough. Basically, the motion of the shoulder was not independent of the rotating motion of the rotating element or tool, which translated lateral forces into the rotating element that lead to its failure.

Hot Shoe Tool I—Invention

Figure 4:
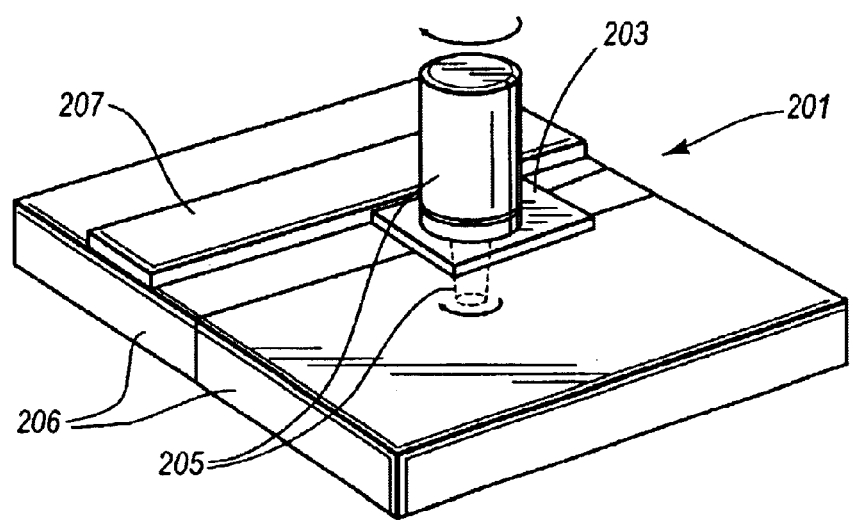
FIG. 4 is a constraining surface is the form hot shoe tool, according to the invention.

A third tool design, shown in FIG. 4, where a constraining surface is in the form of a "hot shoe" tool 201 illustrates an embodiment of the invention. As the name implies, there was no rotating shoulder, but there was actually a non-rotating surface or shoe 203, mounted on a bearing so that it would not rotate with the pin 205, which was plunged into the joint line of two thermoplastic pieces 206. Alternately, the rotating element can be introduced laterally into the end of the materials being welded. Unlike the other methods, the mill head was not angled during welding, but instead sat perpendicular to the surface of the material being welded. Sitting squarely over the weld, the shoe completely covered the weld, not permitting the melted plastic to flow out of the joint area. Heated by an external source (a propane torch in early tests) the shoe's purpose was to heat the material, contain the melted material, improve surface quality, and aid in the fusion process. The shoe was preventing from rotating by a stop or guide fence 207, so that the shoe did not rotate and did translate with the rotating pin along the weld line.

In preliminary tests, using the hot-shoe tool, tensile strengths in excess of 80% of the base material strength (4455 psi and 5472 psi respectively) were achieved. The tool had a long life and repeatedly produced high quality welds with a smooth weld surface.

Hot Shoe Tool II

Figure 5:
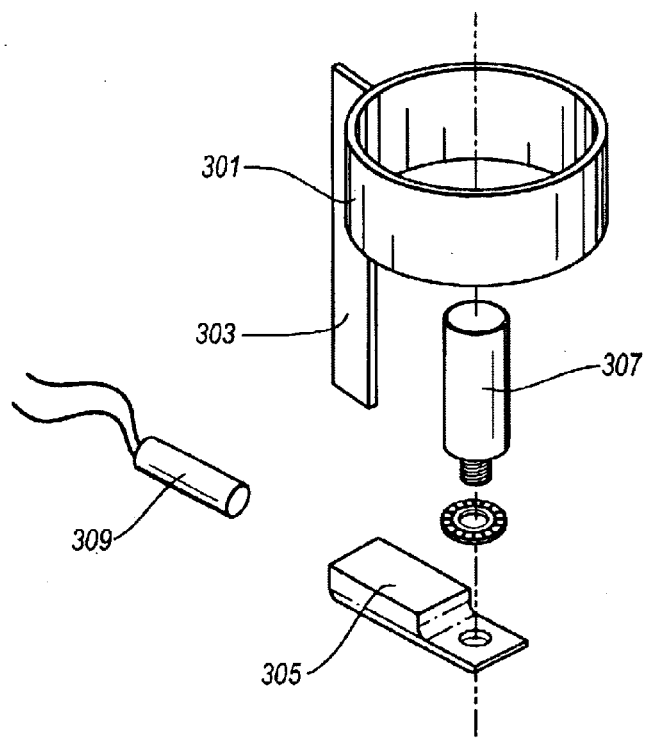
FIG. 5 is an alternate constraining surface is the form of a hot shoe tool, according to the invention.

Another hot-shoe tool design, shown in FIG. 5 was used in a formal, designed (factorial) experiment. A mill spindle sleeve clamp 301 with a downwardly extending stop 303, clamps around the spindle sleeve on the mill. The shoe stop 303 aligns the shoe 305 with the weld and keeps it from spinning with the rotating tool as it translates with the rotating tool 307. This design uses resistive heaters 309 to heat the shoe 305. The rotating tool 307 is also shown with the textured surface comprising threads. For welding ABS, the shoe was held at a constant temperature of 310° F. (within approximately 60° F. of a typical injection molding temperature.)

Figure 6:
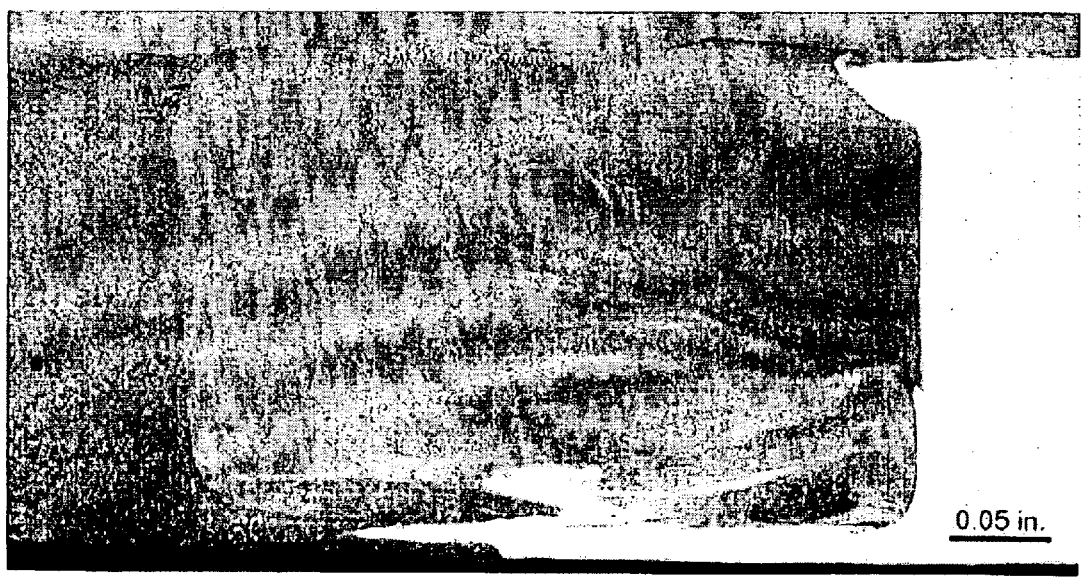
FIG. 6 is a microphotograph showing a cross section of typical weld done with heated shoe tool.

FIG. 6 shows a typical weld done using the heated shoe tool design with a straight tool pin. This is a picture of the weld, looking in the direction of travel. White and black ABS pieces were welded together in this example, to show the flow of material in the weld. The swirl, visible in the upper half of the weld, is formed by the forward movement of the rotating tool pin.

When compared the welds for an aluminum-style tool, this weld is free of voids. This contributed to the significantly higher strength, as discussed below.

Welding Procedure

In the examples a simple welding procedure was used to ensure consistent, accurate results. The welding was done on a standard three-axis mill with power feed on the X-axis. Samples were placed in a fixture that restrained the material both transverse and normal to the weld, with joint surfaces held tightly together. Specimens were securely held against a backing plate to keep the weld material from escaping out the back of the weld. After plunging the tool pin into the joint, the power feed was used to feed the tool along the joint at a constant rate.

The setup procedure was very straightforward and resulted in consistent welding conditions. The precut and deburred plastic pieces were placed in the fixture and then mounted to the mill table with milling clamps. The clamps also held the plastic pieces against the backing plate.

A predetermined order of the combination of the process factors from the experimental design was followed for each weld. Prior to welding, the machine settings listed in Table I were adjusted to the specified levels. The tool with the straight or tapered pin profile was mounted in the machine according to the experimental design. With the machine properly set, the rotating spindle was plunged into the butt joint to the predetermined depth (within 0.010" of the backing plate). A dial indicator was used to determine and monitor the tool depth. The machine settings are shown in Table I.

TABLE I

Machine settings for designed experiment.

| Factors | High level | Low level |
| --- | --- | --- |
| X1 = Machine speed | + = 1000 rpm | − = 400 rpm |
| X2 = Machine Feed Rate | + = 11 11/32 ipm | − = 3 25/32 ipm |

The tool was held at the proper depth for 15–30 seconds to allow the shoe to "settle" into the plastic and to allow the pin to warm up by friction. After this short pause, the machine feed was engaged to advance the tool through the weld. At the proper depth, the heated shoe rode slightly below the original surface of the plastic pieces (approximately 0.010"). The welds were allowed to cool in the fixture after welding to discourage cupping of the pieces due to shrinkage in the weld area during cooling.

Initial welds revealed some problems with the non-threaded tools. The two main problems associated with the nonthreaded tools were lower volume retention and excessive machine stress. While nonthreaded tools had been used with relative success with the aluminum style tool, the hot shoe tool did not work well at all with the nonthreaded tools. Without threads to direct the material back into the weld, the melted plastic flowed out of the weld area from underneath the shoe reducing the volume of the weld material by nearly 50%. The resulting welds had no strength.

The nonthreaded tools also exerted excessive loads on the mill head. Twice while running a weld with the nonthreaded, straight pin, the entire mill head assembly rotated 15° about the vertical axis. The plastic in the joint area also blushed quite a bit, revealing stress cracks which the tool created as it advanced through the material. The reason for these high forces could be related to the lack of threads on the tool pin. Therefore, it is hypothesized that the threaded pin aids tool advancement due to shearing to further melt the plastic in the weld area and by cutting through the weld area material as the tool advances. Likewise, the threads also direct the melted plastic into the bottom of the weld area, keeping it from flowing out of the weld area, as mentioned previously.

Because the nonthreaded weld runs resulted in such poor performance, the experimental runs involving non-threaded tools were removed from the comparison. It can be concluded that non threaded tool pins, in this application, yield weak, unattractive welds while introducing excessive forces on the welding equipment, thus shortening the service life of the equipment.

Mechanical Test Specimen Preparation

After welding, each welded plate was labeled according to its run number and corresponding factors. Three tensile and flexural specimens and two impact specimens were then cut from each welded plate. The specimens were cut out of the plate using a 3-axis CNC mill, ensuring consistent accuracy of specimen dimensions. The specimen geometries were determined according to the ASTM standards for testing polymeric materials listed in Table II.

TABLE II

ASTM testing for polymeric materials.

| Mechanical Test | ASTM Standard | Length (in.) | Width (in.) |
|---|---|---|---|
| Flexural | D-790 | 5.00 | 0.50 |
| Tensile | D-638 | 6.50 | 0.50 |
| Impact | D-3029 | 3.00 | 0.75 |

Locations of the test specimens in the welded plate were carefully considered. The first and last 3.5" of the weld were not used for testing because they were typically not complete welds. The specimens were cut out of the middle 7.0" of the plate so as to represent the start, middle, and end of the good weld region. Each individual specimen was labeled with the run number and position in the weld.

Testing Methods

As mentioned previously, the ASTM standards for testing polymeric materials were followed-for this testing. Table III lists the standard tests and test parameters for each test method used.

TABLE III

Mechanical test parameters.

| Test Method | Test Parameters |
|---|---|
| Tensile Testing | ASTM D 638–96 Type 1 specimen geometry Pull rate: 0.2 inches per minute Distance between grips: 4.5 inches Strain gage length: 1.0 inches Sample cross sectional area: 0.255 × 0.502 inches |
| Flexural Testing | ASTM D 790–96a Test method I: 3 point flex test; flatwise Load rate: 0.11 inches per minute Support span: 4.0 inches Load nose radius: 0.125 inches Support radii: 0.125 inches Stop test at 0.533 inch displacement Sample cross sectional area: 0.255 × 0.500 inches |
| Impact Testing | ASTM D 3029–90 Test Method I Drop height: 30 inches Hammer weight: 15.42 lbs. Top radius: 0.25 inches Support span: 1.5 inches Sample cross sectional area: 0.255 × 0.750 inches |

The specimens were pulled from a box and tested at random, although all three positions for each weld were tested consecutively. For example, specimens were pulled from the box at random, until all three specimens for one weld were chosen. Those three specimens were then tested consecutively.

Method for Analysis

The conversion of the collected raw data into the appropriate mechanical properties was the first step in the analysis. The modulus of elasticity in bending and tension were chosen to represent the material strength. This modulus, a ratio of stress (applied load per square inch) to strain (the amount of displacement per inch of sample length) is a measure of how much energy a material can absorb before undergoing permanent deformation. Impact energy was chosen to represent weld toughness.

For calculations involving cross sectional area, the cross sectional area of the base material samples was used, for two reasons. First, the testing was to be done on as-welded samples, so no post welding operations were performed. This resulted in varying cross sectional areas in the weld area making it difficult to determine an exact thickness. Since it could not be determined exactly where the break would occur in the weld, it was impossible to measure the cross sectional area at the break point. Secondly, any reduction in cross sectional area would be considered a 'penalty' for the weld. An ideal weld should maintain a cross sectional area close to that of the base material. Any variation from this would be considered a fault in the weld quality. Under this premise, calculated tensile or flexural strength would be lower than the actual tensile strength, for welds with reduced cross section.

The converted data and observations made during testing were interpreted using regression analysis and other statistical techniques to determine what factors had the greatest effect on weld quality and strength. The factors included in the full model prior to analysis were selected because of the potential effect they might have had on the weld strength. Interactions between factors were also included. Table IV lists the names and explanations of the factors.

TABLE IV

Factors for regression analysis model.

| Factor | Explanation |
|---|---|
| Speed | The spindle speed of the mill used to weld the samples. |
| Feed | The machine feedrate. |
| Diameter | Profile of tool pin: tapered or straight. |
| Depth | Whether the weld was made with tool at proper depth (w/in 0.01" of backing) |
| Day | Day on which weld was made. |
| Bearing | Whether old or new bearing was used (old > 4 welds) |
| Lift | Whether plastic pieces lifted off backing plate during welding. |
| Center | Whether tool was centered over butt joint during welding (w/in 0.0625") |

Following the procedure outlined previously, welds were made for each experimental run. Five of the runs were repeated due to abnormal problems which occurred during welding. There are many factors to monitor and consider for each weld, so there was some variation in appearance and performance between welds. The statistical analysis was designed to account for these variations and to reveal what factors had the greatest influence on weld properties. The majority of the analysis was done using Minitab statistical software. Linear regression methods were used to analyze the data by creating a statistical model to explain the test results.

Discussion of Results

During these tests, it was found that to form a suitable weld that heat to melt and fuse the material is introduced into the weld area by three principle mechanisms, (1) frictional energy from the rotating pin, (2) frictional energy from threads on the pin, and (3) the heating of the shoe.

The rotating pin inputs frictional energy generated by the frictional forces between the pin and material to be welded. According to the equation for frictional forces, the force normal to the contacting surfaces is directly proportional to the resulting frictional force.

$$F = \mu N \qquad (1)$$

Where:

F=resultant friction force $\mu$=coefficient of friction

N=normal force

Because the leading, rotating surface of the tool pin exerts the largest normal force on the plastic, this is the area where the most frictional energy is inputted into the plastic. According to rheological principles, the speed of the rotating pin is directly related to the energy created through frictional/shearing forces. The surface velocity of the pin is directly related to the machine spindle speed and pin diameter. Therefore, a large diameter pin has a higher surface velocity than a small pin rotating at the same speed.

Finally, the heated shoe inputs energy by heating the top surface of the weld area. The frictional energy from the rotating tool, even with the threads on the tool is inadequate to form an optimum weld. This is due to the natural lubricity of plastics, producing significantly less friction when compared to metals under the same conditions. Accordingly, it is also necessary to introduce heat energy. In this example this was through the shoe constraining surface. This additional heated energy assists in controlling the energy input into the weld, by introducing energy in the top portion of the weld. The constraining surface also assists in smoothing the top of the weld and improving the weld appearance and discouraging the formation of stress risers on the weld.

These energy inputs effectively fuse sufficient to weld the thermoplastic material in the weld area, but they are very localized. The great majority of the energy is only introduced into the material directly in the path of the tool pin. The material to the sides of this path receives only a fraction of the total friction and shear energy. This is mainly due to the fact that the material in the path of the pin is actually displaced and melted, whereas the material to the side of the path is only heated by contact with the hot tool pin, melted material, and heated shoe. These principles will be used to explain the results of the mechanical testing.

Tensile Testing

Tensile testing is one of the most common tests performed in research when testing mechanical properties. Several properties, such as tensile strength, tensile modulus, and yield strength are determined by this test. As shown in Table V, the data from this test reveals that the machine spindle speed has the greatest influence on weld performance, under tensile loading, of the three design factors of speed, feed and tool.

TABLE V

Summary of tensile testing results on welded samples.

| Factor | Level | Tensile Strength (psi) | Stress at yield (psi) | Stress at break (psi) | Strain at yield (%) | Tensile Modulus (ksi) | % Breaks at profile |
|---|---|---|---|---|---|---|---|
| Speed | Low | 3863 | 3692 | 3857 | 1.81 | 232.35 | 100 |
|  | High | 4615 | 4439 | 4287 | 1.97 | 268.84 | 21 |
| Feed | Low | 4724 | 4466 | 4676 | 1.94 | 260.76 | 96 |
|  | High | 3970 | 3928 | 3717 | 1.89 | 245.74 | 62 |
| Tool | Straight | 4309 | 4177 | 4270 | 1.70 | 264.05 | 89 |
|  | Tapered | 4218 | 4163 | 3941 | 2.06 | 242.02 | 64 |

Figure 7:
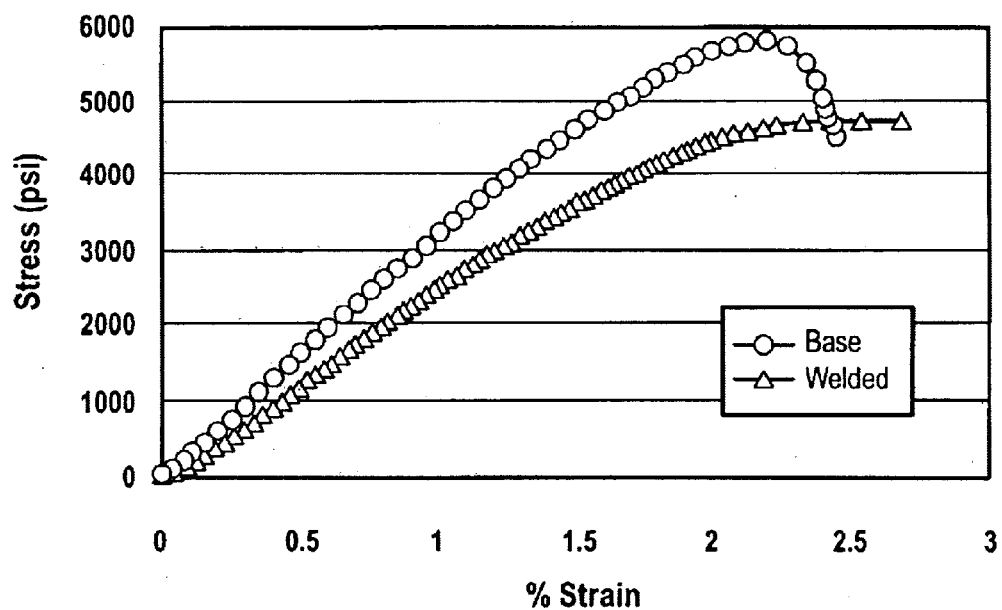
FIG. 7 is a graph showing a stress-strain curve for base material and welded ABS.

FIG. 7 shows a representative stress-strain curve comparing the tensile characteristics of the base and welded ABS materials. This plot graphically reveals that the welded ABS has a lower modulus and lower tensile strength than the base material. The tensile modulus was calculated according to Equation (2)

$$E_T = \sigma/\epsilon \qquad (2)$$

Where:

$E_T$=Tensile Modulus $\sigma$=Stress $\epsilon$=Strain

Average values for the modulus of ABS are $230 \times 10^3$ psi to $390 \times 10^3$ psi. According to this test, the modulus for welded ABS ranged from $167 \times 10^3$ psi to $398 \times 10^3$ psi with an average of $254 \times 10^3$ psi.

The regression analysis for this data gave some interesting results. Using stepwise regression and an extra-sum-of-squares F-test, a reduced model was found to accurately fit the data. It was possible to remove the 'diameter' factor and still have a sufficient model, however, 'diameter' was kept in the model because of its relative statistical significance. This analysis resulted in the following model shown in Equation (3)

$$\text{Tensile modulus} = 240 + 43.0 \text{ Speed} - 26.3 \text{ Diameter} \qquad (3)$$

Where:
  Speed=machine spindle speed (1=high, 0=low)
  Diameter=tool pin diameter (1=tapered, 0=straight)

Figure 8:
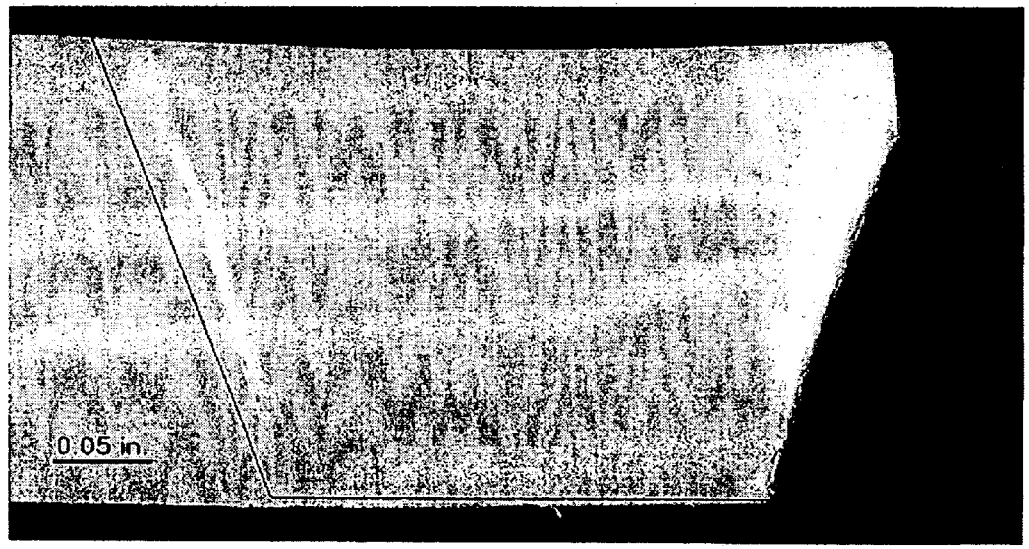
FIG. 8 is a photomicrograph of a cross section of friction stir weld in ABS, after failure along tapered pin profile due to tensile loading.

This model shows that the higher spindle speed increases the modulus by 43,000 psi over the low spindle speed. This could be caused by the higher heat generated by the faster spindle speed. This increased weld temperature affects the melted material as well as the untouched base material it fuses with upon cooling. At higher temperatures, fusion at the interfacial boundary improves, possibly producing a more homogeneous joint with increased mechanical properties. Table V, above, indicates a relationship between the process parameters and this interfacial boundary. The parameters resulting in higher mechanical properties typically broke inside the weld material (inside the tool pin profile.) The weaker welds typically broke along or outside of the profile of the tool pin as in FIG. 8. This figure is a picture of the cross section of a welded tensile specimen after failure. It is apparent in the picture that the blushing and eventual failure of the specimen occurred along the profile of the tapered tool pin (outlined by the black line in the picture.) Note how the specimen blushed in a swirl pattern similar to the pattern in FIG. 6.

The regression model reveals other effects associated with the tool pin profile. If a tapered pin is used, the modulus decreases by 26,300 psi; over 10% of the average calculated modulus. This difference may be related to the previous discussion concerning spindle speed. The tapered pin has a smaller surface area than the straight pin, therefore the surface speed of the rotating straight pin is greater than the surface speed of the rotating tapered pin. The higher surface speed would generate more heat due to friction, thus helping the weld fuse better to the base material.

Figure 9:
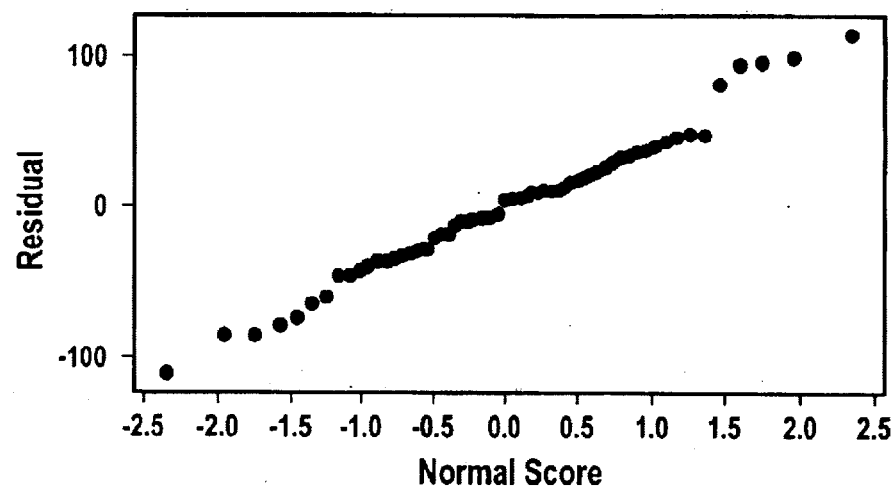
FIG. 9 is a normal probability plot of residuals for tensile data.

This model has an r-squared value of 20.7%. This is not a very high value, however, considering the variation experienced in this experiment, this is an acceptable value. The normal plot for the residuals in this model is shown in FIG. 9.

Figure 10:
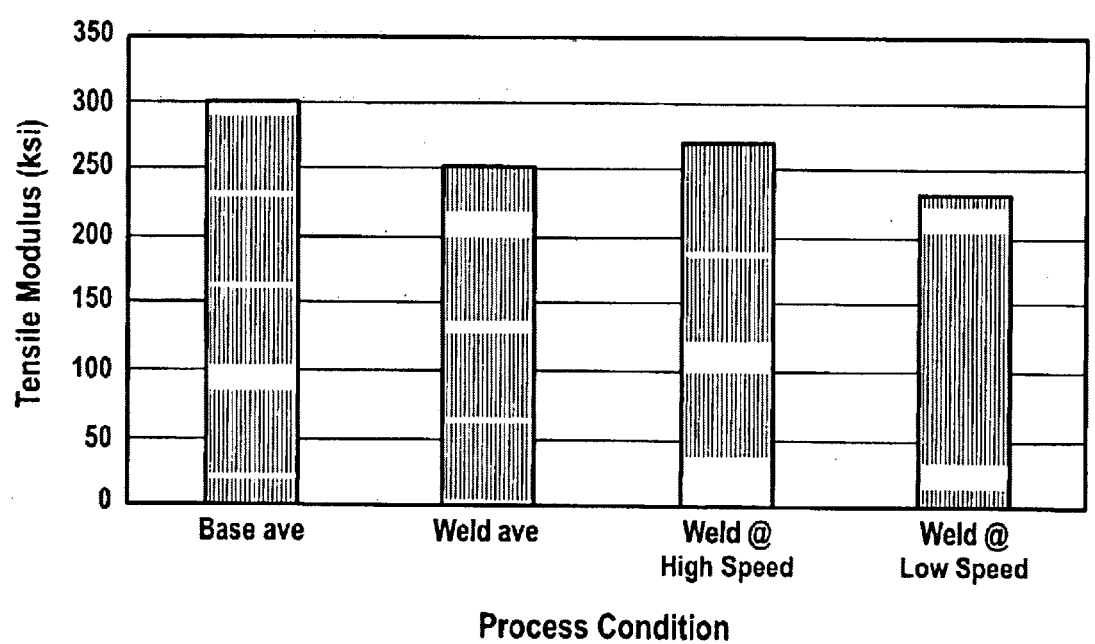
FIG. 10 is a graph showing tensile modulus for base material and welds compared.

The regression model, Equation (3), accurately predicts a difference between the tensile modulus of the samples welded at the high and low spindle speeds. FIG. 10 is a graphical representation of the comparative average moduli for the base material and the welds at the high and low spindle speeds. The average values are shown according to the spindle speed, because this proved to be the factor that produced the most significant difference between the welds. While the average weld modulus is low compared to the strength of welds done with some other joining processes, nearly half of the welds had a modulus of at least 80% of the base material modulus. Although the modulus of the welds is good, the modulus does indicate that the weld is not as stiff as the base material.

Figure 11:
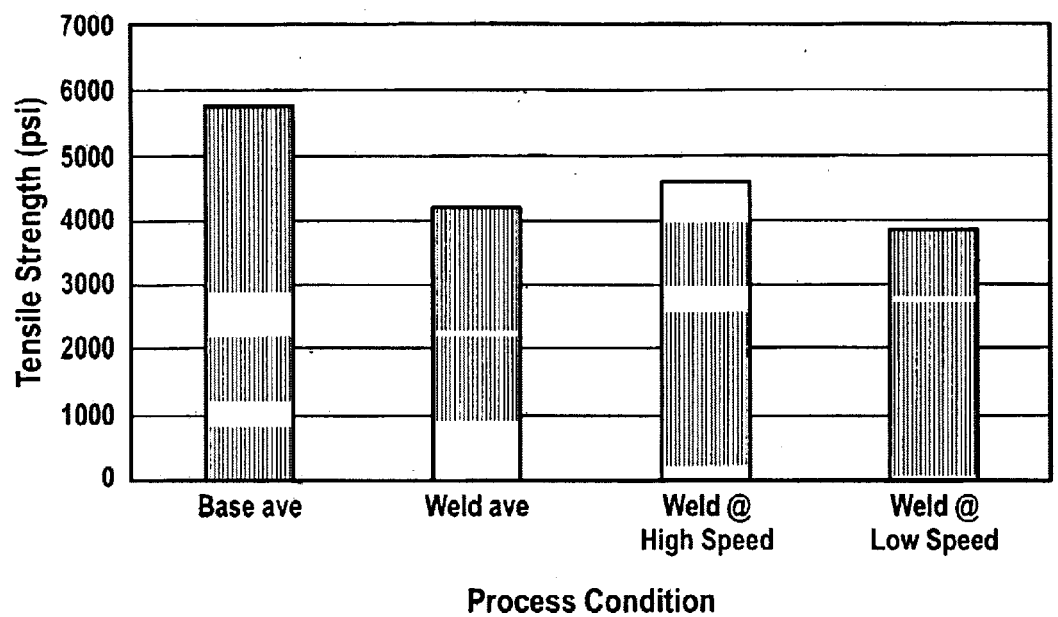
FIG. 11 is a graph showing tensile strength for base material and welds compared.

The tensile strengths of the welded materials are also fairly high. The average weld tensile strength is 76.5% of the base material tensile strength. Almost half of the welds had a tensile strength within 80% of the base material tensile strength. FIG. 11 displays the tensile strength data for the base material and the welds at the high and low spindle speeds.

Machine spindle speed is the most significant factor affecting the tensile mechanical properties of the weld. High spindle speed results in a higher tensile modulus and strength than welds done with the low spindle speed.

Flexural Testing

Flexural testing is useful in determining the flexural modulus of a material. This is a useful property because, like tensile modulus, it is related to the stiffness of a material. The orientation of the weld could possibly influence the results of the flexural test, so the specimens were tested in two different orientations. The specimens removed from the beginning and end of the welded test plates Were tested with the load applied to the bottom or root side of the weld. Specimens removed from the middle section of the weld were tested with the load applied to the top of the weld, which often resulted in crack propagation at the root line on the backside of the weld.

TABLE VI

Summary of flexural testing of welded samples.

| Factor | Level | Flexural Modulus (ksi) | Load at 0.5 inch deflection |
|---|---|---|---|
| Speed | Low | 261.48 | 45.81 |
|  | High | 266.03 | 47.17 |
| Feed | Low | 267.48 | 46.06 |
|  | High | 264.66 | 47.33 |
| Tool | Straight | 264.90 | 46.38 |
|  | Tapered | 266.36 | 47.03 |

The results from the flexural testing, shown in Table VI, offered further evidence of the importance of specific process factors. The raw test data was used to determine the modulus of elasticity of the polymer in bending. The modulus was calculated using Equation (4)

$$E_B = \frac{L^3 m}{4bd^3} \quad (4)$$

Where:
  $E_B$=modulus of elasticity in bending (psi)
  L=support span (in.)
  b=width of beam tested (in.)
  d=depth of beam tested (in.)
  m=slope of the tangent to the initial straight-line portion of the load-deflection curve (lbf./in.)

Figure 12:
FIG. 12 is schematic isometric view of friction stir weld in ABS showing blushing after flexural testing with load applied to root side of weld.

An average value for $E_B$ of compression molded ABS is $338 \times 10^3$ psi while the values obtained for the welded specimens in this test ranged from $242 \times 10^3$ psi to $333 \times 10^3$ psi with an average of $270 \times 10^3$ psi. It was also noted that the orientation of the specimen did not affect the overall modulus average. The average of the specimens from the beginning and end of the weld was the same as the average of the specimens from the middle of the weld, however, all of the specimens loaded on the top surface (middle specimens) broke once they deflected 0.3–0.4 inches. Specimens loaded on the root side of the weld (beginning and end specimens) did not break with deflections as high as 0.6 inches. Such a specimen is shown in FIG. 12. This picture shows a bit of the top and cross section of a flexural specimen with the load applied to the root side, showing the typical areas that blushed during flexural testing. The profile of the tapered tool pin is outlined in black.

Figure 13:
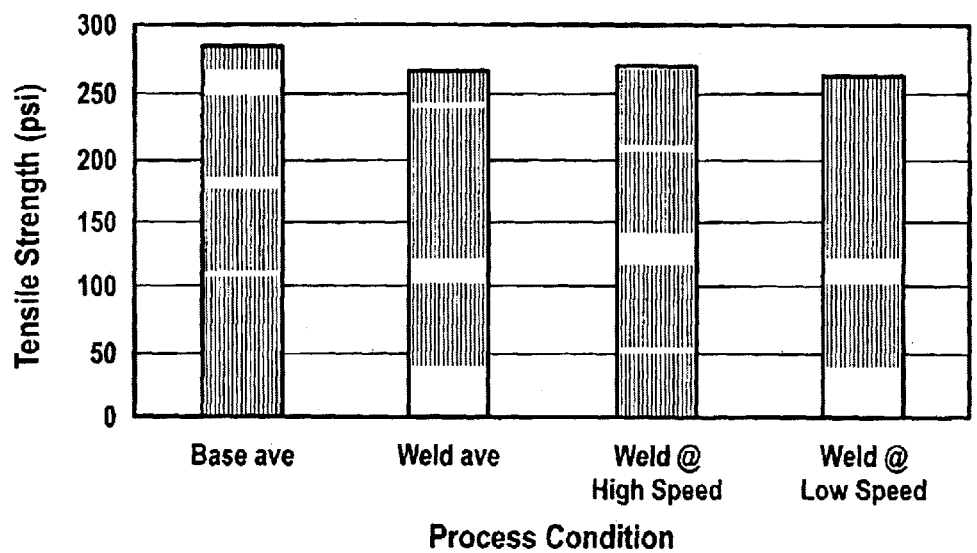
FIG. 13 is a graph showing modulus of elasticity in bending of base material and welds compared.

FIG. 13 reveals that the average modulus of elasticity in bending, for the welded specimens is 93% of the modulus of the base material. The highest weld modulus was nearly as high as the base material's modulus, showing the potential for welds which are equally as strong as the base material, in bending.

Figure 14:
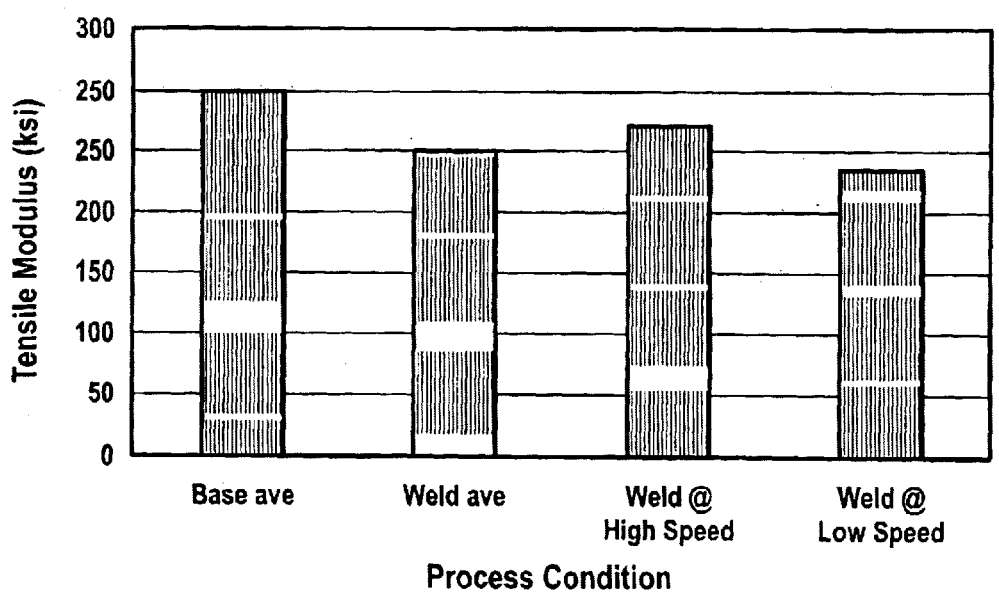
FIG. 14 is a graph showing results of flexural test, using load versus displacement plot of base material and welds.

With the flexural testing, the welded samples appeared nearly comparable to the base material samples. While the average modulus is lower, the majority of the welds did not fail during the testing, even when undergoing displacements of up to one inch. Several of the load-displacement plots for the welded samples are nearly identical to the plot for the base material, as in FIG. 14. In this figure, the base material is represented by the upper, lighter colored curve. Even the samples which were tested with the load applied to the weld side of the joint exhibited a similar flexural modulus to that of the base material. While the moduli may have been similar, most of the welds carried maximum loads under 45 lbs. compared to 49.0 lbs carried by the base material. This indicates a weaker joint than the base material, however this is still a very acceptable load.

The regression analysis of this data revealed further evidence of the significant effect associated with spindle speed. Stepwise regression and the Extra-Sum-of-Square F-test were used to develop the best fitting model for the data. It was necessary to remove the end specimen of run 22, because it appeared to be an outlier. Equation (5) is the regression model that resulted from this analysis:

$$\text{Modulus of Elasticity} = 264 + 4.95 \text{Speed} - 11.1 \text{feed*lift} \quad (5)$$

Where:

Speed=machine spindle speed (1=high, 0=low)

Feed*lift=interaction between machine feed and whether or not plates lifted off backing plate (1=high feed with lift, 0=other combinations)

(See Table IV for explanation of variables.)

Figure 15:
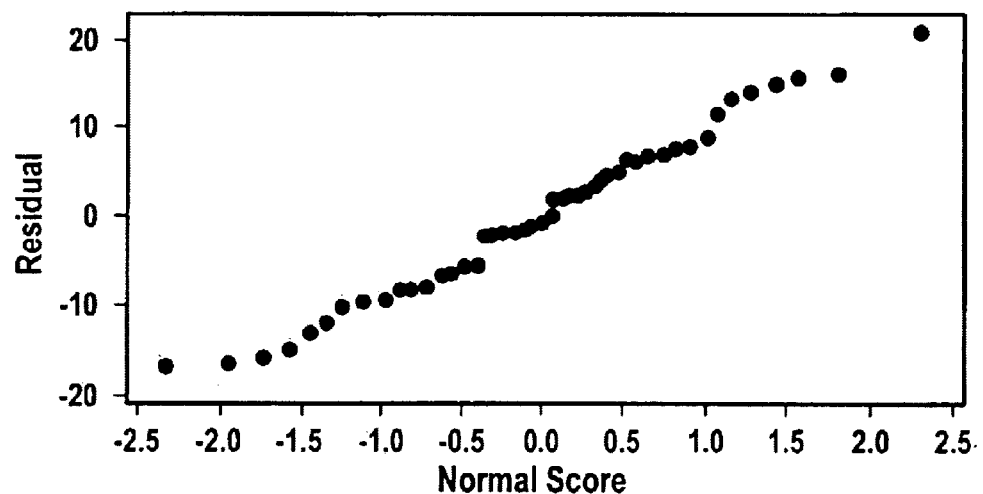
FIG. 15 is a graph showing a normal probability plot of residuals for flexural data.

The feed*lift factor reveals that when the plastic pieces lift off the backing plate during high feed, the modulus of elasticity decreases by 11,100 psi; nearly 10% of the modulus. This reduction in mechanical properties is due to voids which form in the weld under these conditions. Only four samples actually lifted off of the backing plate, so this is not a very common occurrence, but procedures should ensure good contact between weld samples and the backing plate. This model also reveals that while holding the 'feed*lift' relationship constant, the high spindle speed results in a 4950 psi increase in the modulus of elasticity over welds at the low speed. Similar to the tensile analysis, speed is the most important factor affecting weld strength as measured by the modulus of elasticity in bending. This model has an r-squared value of 20.2%. While this is not a large r-squared value, it is a fairly good fit for this type of data. FIG. 15, the normal plot of the residuals in this model, indicates a good distribution of the data.

Impact Testing

Impact testing is a useful way to measure the relative toughness of materials. To ensure that the toughness of the weld itself was measured, the specimens were oriented so the impact load was applied to the root side of the weld. The metric chosen to measure impact performance was energy at impact as this is a good measure of weld toughness. The value for impact energy represents the area underneath the stress-strain curve for the given materials. A large area and therefore a large impact energy value are optimal. High values arise from extremely high moduli or large strain values.

As is the case with base materials, when doing a comparative analysis of welds, higher moduli will typically result in a lower impact energy value. This is because the specimens with the higher modulus typically have a lower maximum strain value, resulting in a lower overall area under the stress-strain curve, often the case with welded samples. However, when comparing the welded specimens to the base material, the base material has both a higher modulus and a higher impact energy.

TABLE VII

Summary of impact testing of welded samples

| Factor | Level | Impact Energy(ft-lbs.) | Max Load (lbs.) | Deflection at failure (in.) | % Breaks at profile |
|---|---|---|---|---|---|
| Speed | Low | 33.06 | 15.34 | 0.3875 | 60 |
|  | High | 31.44 | 11.99 | 0.1386 | 73 |
| Feed | Low | 31.07 | 12.73 | 0.0893 | 38 |
|  | High | 32.91 | 14.14 | 0.3585 | 85 |
| Tool | Straight | 31.76 | 13.70 | 0.1850 | 39 |
|  | Tapered | 32.55 | 13.56 | 0.3187 | 88 |

Figure 16:
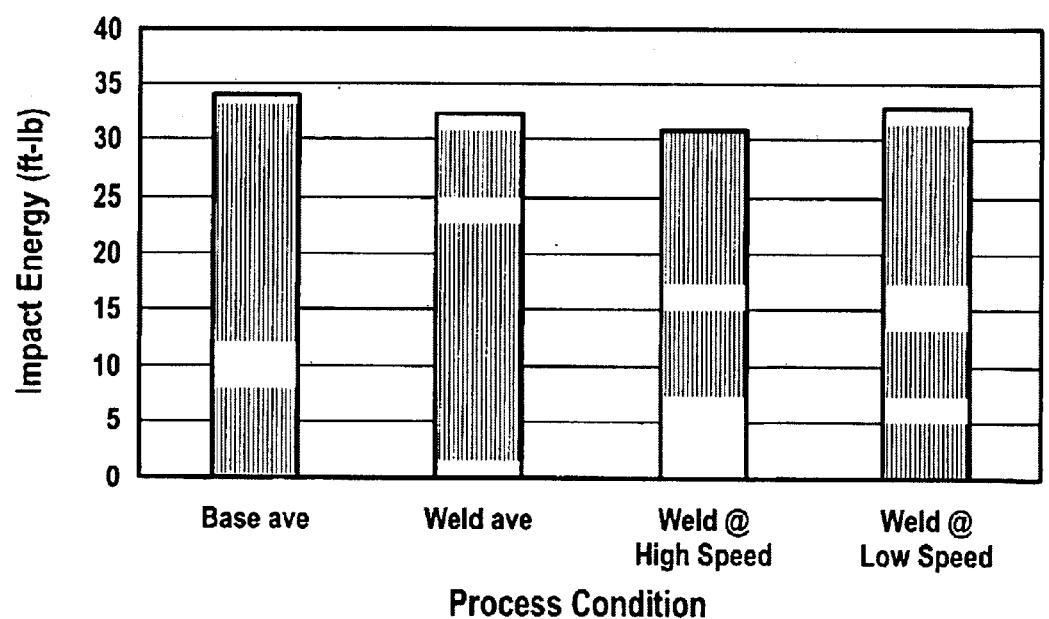
FIG. 16 is a graphs comparing impact energy of base material and welds.

The results of impact testing revealed that impact energy was not dramatically affected by welding. The results of impact testing are shown in Table VII. This table also summarizes the effects of the three experimental process factors on weld performance. The base material tested exhibited an average impact energy of 33.83 ft-lbs, while the welded specimens ranged from 28.06 ft-lbs to 37.89 ft-lbs with an overall average value of 32.18 ft-lbs. The average impact energy of the welds was 93.7% of the impact energy of the base material. This is an excellent value, indicating that the weld is nearly as tough as the base material. FIG. 16 displays this comparison, graphically.

It is interesting to compare the percentage of specimen failures that occurred inside the weld itself (Table VII) with the results from the tensile testing in Table V. The failure modes of the impact specimen were very similar to the failures in the tensile specimens. Although the high spindle speed had a high number of breaks outside or along the tool pin profile from the impact testing, the two other parameters that produce strong welds (low feed and a straight tool pin) resulted in very few breaks along the tool pin profile, as was the case with the tensile specimens. There appears to be a strong relationship between weld strength and the location of the part failure. It appears that weaker welds fail at the interface boundary created by the tool pin as it advances through the material.

The regression model for the impact testing results offered some different information than the tensile and flexural testing. Equation (6) is the regression model that resulted from the regression analysis.

$$\text{Impact Energy} = \frac{34.2 - 1.88 \text{ Bearing} - 1.83 \text{ Depth}}{-2.60 \text{ speed*feed} + 1.85 \text{ feed*dia}} \quad (6)$$

Where:

Bearing=age of thrust bearing (1=<4 welds, 0=>4 welds)

Depth=depth of tool pin and shoe (1=0.24", 0=<0.24")

speed*feed=interaction of spindle speed and machine feed (1=high spindle/high feed, 0=other combinations)

feed*dia=interaction of machine feed and tool pin diameter (1=high feed/tapered diameter, 0=other combinations)

Figure 17:
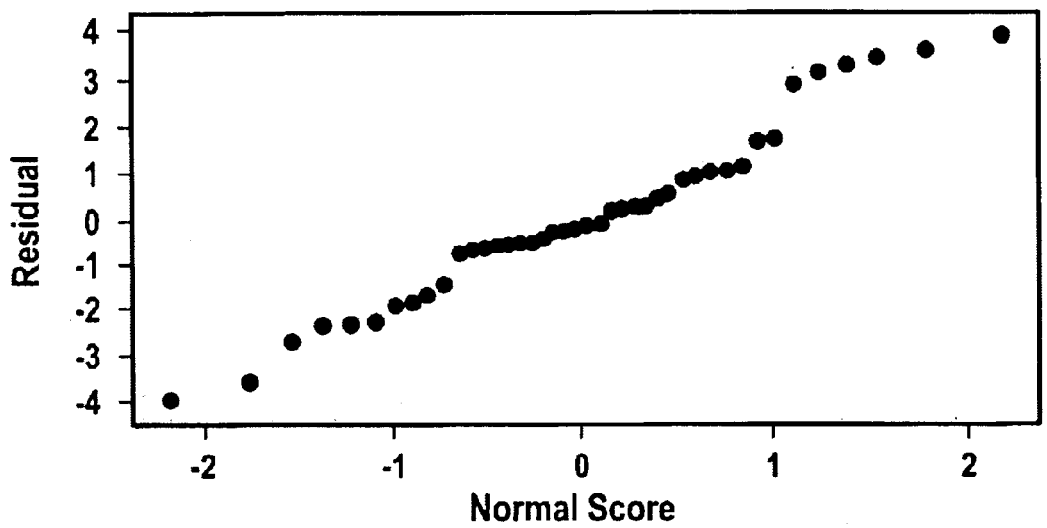
FIG. 17 is a graph showing a normal probability plot of residuals for impact data.

This model is very interesting because it involves factors and interactions from the experiment that the other models did not include. However, unlike the two previous models, the model for impact strength does not include a simple effect for speed. Instead, there is an interaction between speed and feed. When the machine speed and feed are high, the impact strength decreases by 2.60 ft-lbs. This seems logical, because the tensile and flexural testing revealed that a high speed significantly increases the modulus over the low speed, thus yielding a stiffer weld and lower impact energy. This model has an r-squared value of 52.7% and the normal plot of residuals exhibits good normality. (FIG. 17) Therefore, this model accurately fits the data.

Analysis Summary

Figure 18:
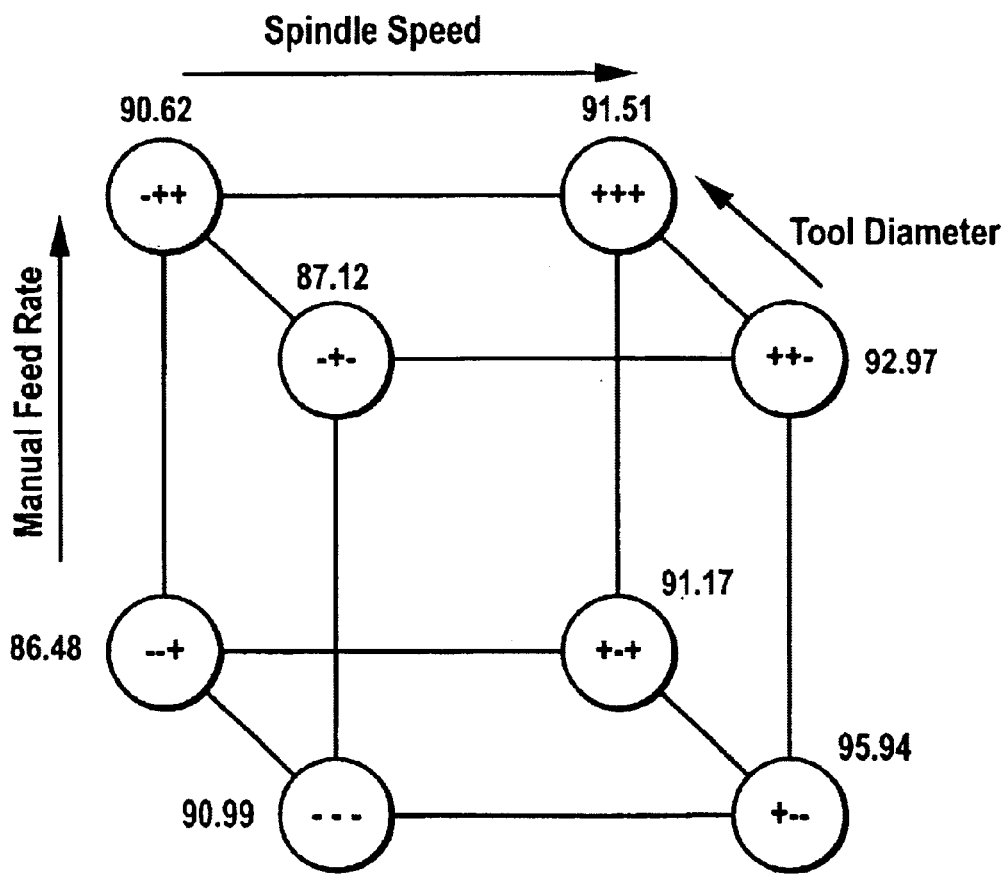
FIG. 18 is a graph showing a cube plot of process factors.
Figure 19:
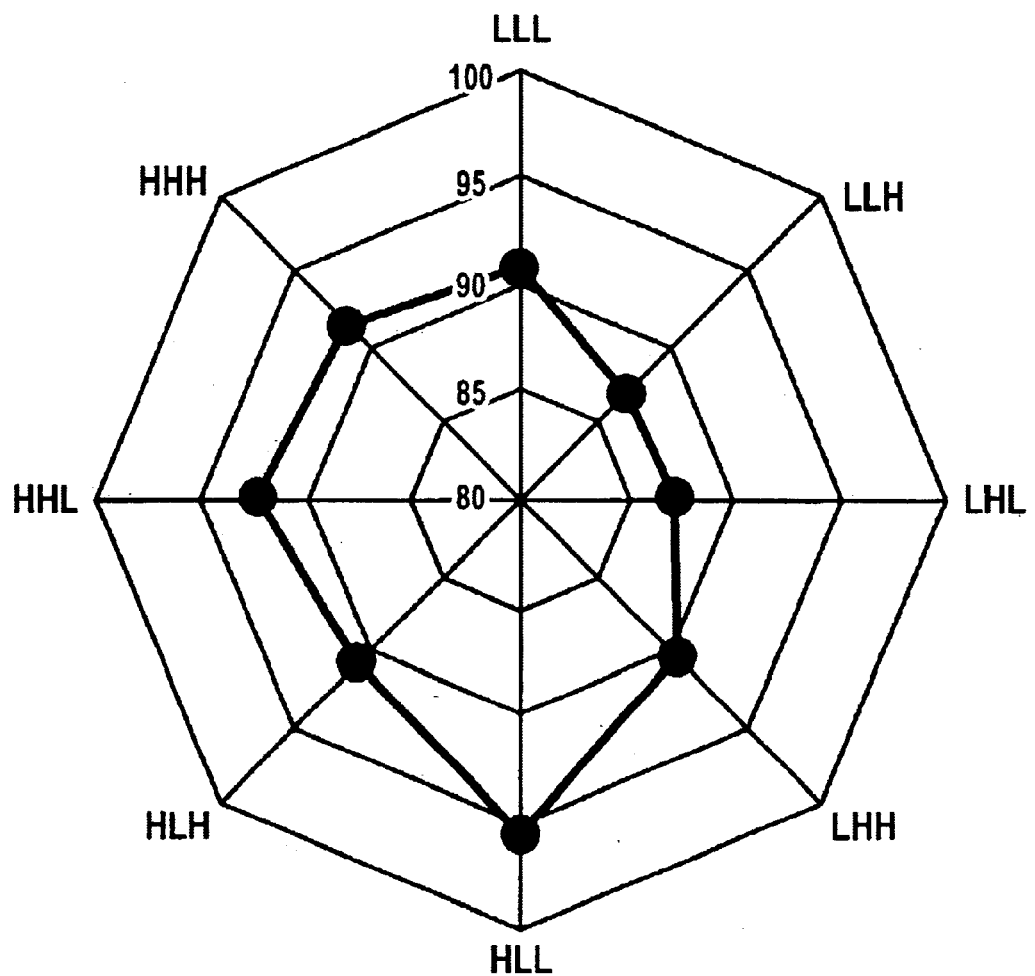
FIG. 19 is a radar plot of percentages as related to factor combinations.

Combining the data from the three mechanical tests results in some very apparent patterns. FIGS. 18 and 19 are cube and radar plots of the data, respectively. The values used for these plots were determined by averaging what percentage the average results of the mechanical tests for the welds at each setting were, compared to the base material. These graphic representations of the data revealed that the combination of factors that produced the strongest weld was a high spindle speed, low feed, and straight tool pin profile (+−−). This supports the results from the previous analyses done on the individual factors.

Table VIII summarizes the individual effects of the three main process factors as measured in the three different tests. Values presented in this table represent average values of all of the specimens welded at the given level of each factor. This data reveals the large effect which the machine spindle speed has on the mechanical properties of the welds. Increasing the spindle speed results in an increase in tensile and flexural modulus, and a decrease in impact energy within the welded specimens. Though less dramatic increasing the machine feed rate appears to decrease the mechanical properties of the weld in the flexural and tensile testing, while increasing the impact energy. The effects of pin diameter do not appear as significant as suspected. It is worth noting, however, that the welds produced with the tapered pin do not seem to do as well in tension as the straight pin welds.

TABLE VIII

Summary of effects of process factors.

| Factor | Level | Tensile Modulus (ksi) | Flexural Modulus (ksi) | Impact Energy (ft-lbs) |
|---|---|---|---|---|
| Speed | Low | 232.36 | 261.48 | 33.06 |
| | High | 268.84 | 266.03 | 31.44 |
| Feed | Low | 260.76 | 267.48 | 31.07 |
| | High | 245.74 | 264.66 | 32.91 |
| Tool | Straight | 264.05 | 264.90 | 31.76 |
| | Tapered | 242.02 | 266.36 | 32.55 |

The results from the tensile and impact testing indicate a direct relationship between the process factors, weld strength, and the location of the part failure. High spindle speed, low feed, and a straight pin result in the strongest welds. These strong welds also typically break inside of the tool pin profile, or inside the weld material. As discussed previously, this may be due to the greater heat produced by the higher surface speed of the straight pin rotating at the high spindle speed, which seems to result in better fusion in the weld area.

The energy inputted into the weld area and the level of disturbance experienced by the molecular chains in the weld area seems to directly affect the mechanical properties of the weld. With processes such as hot tool welding, heat applied to the joint surfaces breaks the bonds between the molecular chains in the material allowing the material to melt and flow. When the melted surfaces are pressed together in hot tool welding, the molecular chains move across the joint and tangle with other chains forming secondary bonds, fusing the surfaces together upon cooling.

Figure 20:
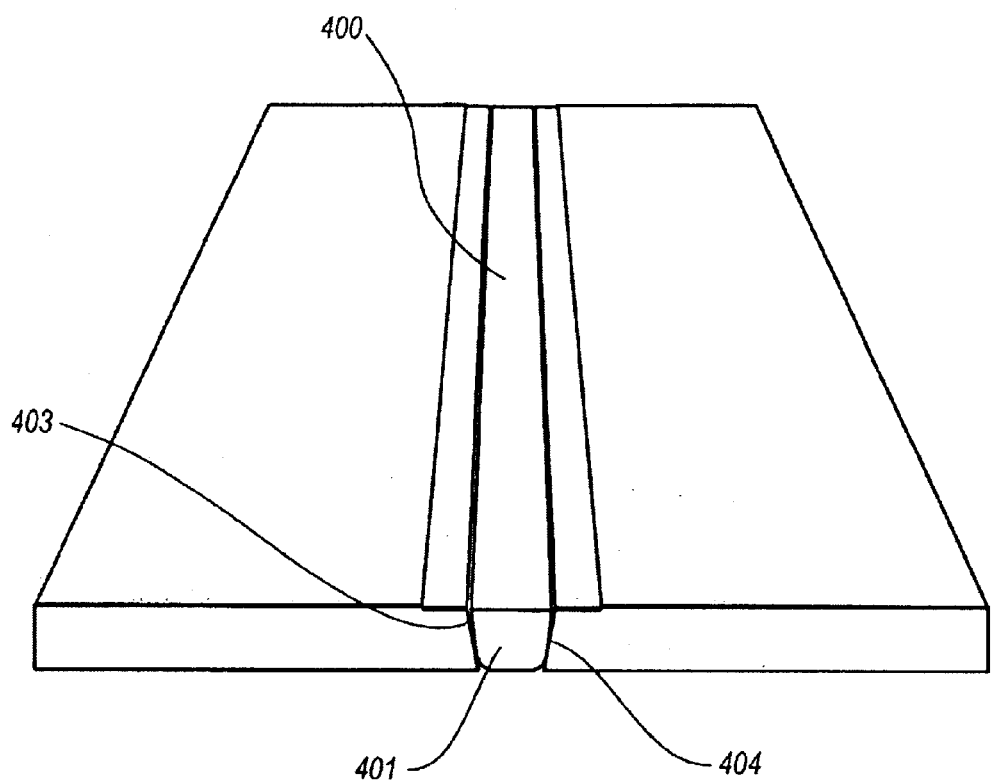
FIG. 20 is schematic showing areas of high and low molecular disturbance produced by the rotating element (in the form of a tool pin) in friction stir welding.

Friction stir welding, on the other hand, dramatically disturbs the molecules in the weld area. Referring to FIG. 20, the rotating pin melts the material in its path 400 by cutting the molecular chains and inputting energy into the weld area as discussed earlier. This results in a very large disturbance of the molecular chains in this area 401. While the material along the pin path that is not disturbed does not melt, it is softened enough by the friction generated by the tool, to allow it to fuse with the "disturbed" material in the tool path during cooling. This dramatic difference in the disturbance of the molecular structure in the high disturbed 401 and undisturbed (or low disturbed) areas 403 of the weld results in a "disturbance boundary" 404 inside the weld area, that follows the path of the pin through the entire length of the weld. This boundary is where the weaker welds tended to break during testing.

The welds done with the optimal process parameters mentioned earlier do not appear to have such a pronounced boundary as the weaker welds, which allows them to carry higher loads before failure. Even at failure, the stronger welds typically did not break along this boundary. Therefore, stronger welds will be obtained by reducing or eliminating the disturbance boundary in the weld area.

Further Welding

To test the process parameters further, several more welds were made on a variety of materials and joint configurations using the effective parameters established during testing. To test the versatility of this process, welds were made in high density polyethylene (HDPE), ultra-high molecular weight polyethylene (UHMW), polyvinylchloride (PVC), polypropylene (PP), polyvinyldenefluoride (PVDF), nylon 6—6, and polytetrafluoroethylene (PTFE) or Teflon. Basic butt joints, lap joints, and circumferential welds were made during this testing.

Butt Joints

Figure 21:
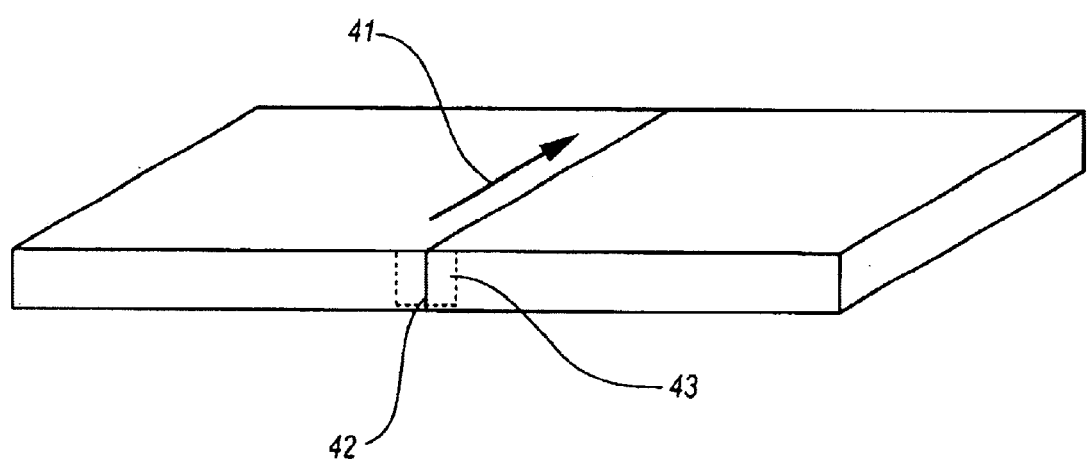
FIG. 21 is a schematic showing an end view of butt joint with 0.25" thick material.

Butt joints were made in HDPE, UHMW, PP, PVDF, and Teflon, using fixtures and tools similar to those used for ABS. For these materials, a heater cartridge was added to the shoe, and cooling air was used as needed to maintain a constant shoe temperature. For these tests, the important parameters included shoe temperature, spindle speed, and feed rate. FIG. 21 is an illustration of an end view of a typical butt joint, showing the weld direction 41, the joint surfaces 42, and the tool position 43 bounded by the dotted lines.

High Density Polyethylene Butt Joint

Welds were run in 0.25 inch thick HDPE, using a straight, threaded pin with a heated shoe. The temperature of the shoe was varied from 100 to 400 degrees F., the spindle speed was varied from 1000 to 2000 rpm, and the feed speed was varied from 3 to 15 inches per minute. Good results were obtained at a variety of conditions. At a shoe temperature of 135 degrees, a spindle speed of 1800 rpm, and a feed of 2.21 ipm, the average tensile strength of the weld was 91.5% of the base material strength.

UHMW Butt Joint 0.25 inch thick UHMW plate was welded using the same tool and fixture as HDPE. The speed was varied from 1000 to 1800 rpm, the feed was varied from 1 to 3 ipm, and the foot temperature varied from 390 to 470 degrees F. At a feed of 2 ipm, a temperature of 450 degrees, and a speed of 1800 rpm, weld strengths were 75% of the base material strength.

PP Butt Joint 0.25 inch thick PP plate was welded using the same tool and fixture as HDPE. The speed was varied from 950 to 1500 rpm, the feed was varied from 6 to 22 ipm, and the foot temperature varied from 160 to 210 degrees F. At a feed of 10 ipm, a temperature of 230 degrees, and speed of 1500 rpm, weld strengths were up to 86% of the base material strength.

Nylon 6—6 Butt Joint 0.25 inch thick Nylon 6—6 plate was welded using the same tool and fixture as HDPE. The speed was varied from 500 to 1500 rpm, the feed was varied from 1 to 8 ipm, and the foot temperature varied from 200 to 500 degrees F. At a feed of 2 ipm, a temperature of 200 degrees, and a speed of 1500 rpm, weld strengths were approximately 40% of the base material strength.

PVDF Butt Joint 0.25 inch thick PVDF plate was welded using the same tool and fixture as HDPE. The speed was 1800 rpm, the feed was varied from 4 to 10 ipm, and the foot temperature varied from 230 to 265 degrees F. At a feed of 10 ipm, a temperature of 265 degrees, and a speed of 1800 rpm, weld strengths were 75% of the base material strength.

Teflon Butt Joint

The butt joint in Teflon did not turn out well. Teflon is very difficult to process, because it does not readily melt and flow. Instead, it must be sintered during processing. Because of this behavior, the material did not melt and flow in the weld area during welding. Instead, the tool just chopped the material up resulting in a very week weld. It was interesting to note, however, that the spindle speed at the beginning of the weld was 1600 rpm. This speed was lowered to 1400 rpm, however, because the higher spindle speed generated too much heat, thus degrading the material. This example illustrates the necessity of melting the plastic material, i.e., that it be sufficiently thermoplastic in nature, to form a suitable weld.

Flat Lap Joints

Figure 22:
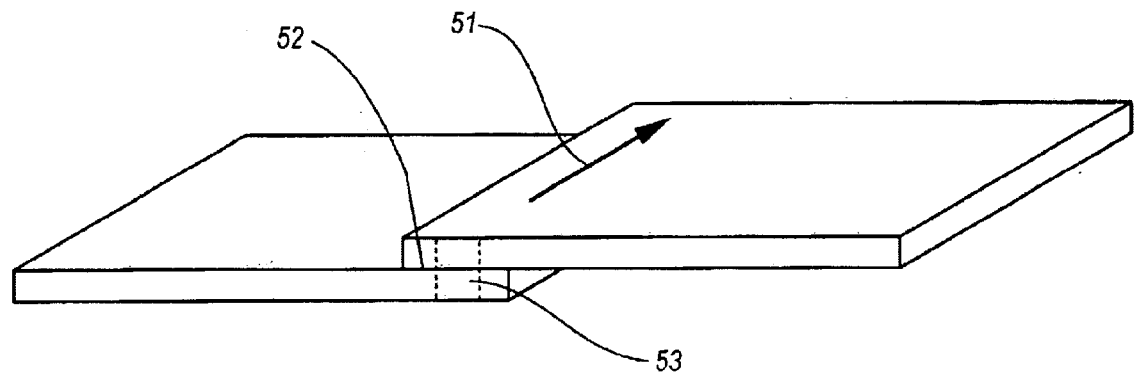
FIG. 22 is a schematic showing an end view of typical lap joint with 0.25" thick with 1" overlap.

Lap joints are another common joint geometry in plastics, so welds were done to see how well lap joints could be welded using friction stir welding. The fixture used to weld butt joints was used to weld the lap joints. A tool with an extended pin was used to penetrate through the top piece and into 90% of the lower piece. High spindle speed, and low feed were used for this test run. A low feed of $3^{25}/_{32}$ inches per minute was used, to decrease the load on the extended pin in order to reduce the effects of cyclic fatiguing. FIG. 22 shows the end view of a typical lap joint, showing the weld direction 51, the joint surfaces 52, and the tool position 53 bounded by the dotted lines. The lap shown is about 1 inch wide.

ABS Flat Lap Joint

The lap joint weld turned out well, except for two minor problems. First, the extra amount of melted material resulted in a pronounced weld bead, due to the viscoelastic effect of the material. This expansion may have led to the second defect—small voids in the upper part of the weld. The voids were small, but they would still decrease the mechanical properties of the weld.

Circumferential Lap Joints

Figure 23:
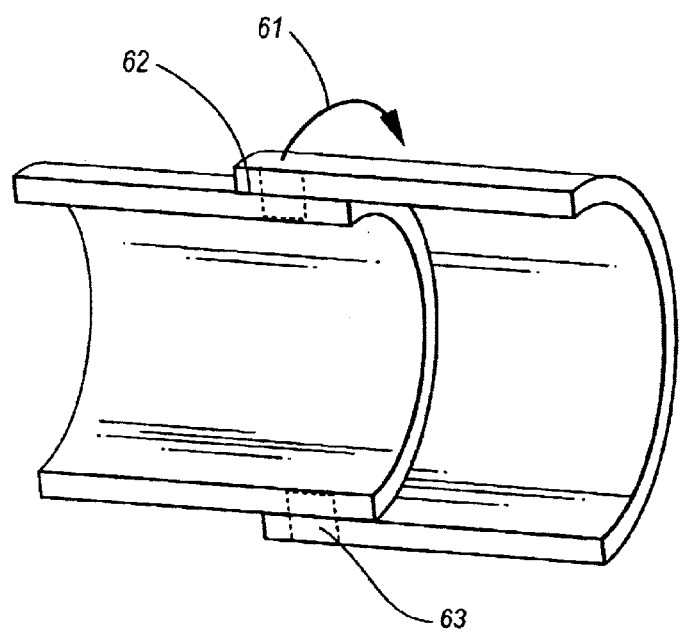
FIG. 23 is a schematic showing a cutaway view of circumferential lap joint for 3", schedule 40 pipe.

Circumferential lap joints were welded together to join 3", schedule 40 pipes and couplers together. To make these welds, a heated shoe was made with a 4" radius to match the outside radius of the coupler. An extended pin was also made to extend through the coupler and into 90% of the thickness of the pipe. The joint was clamped together using aluminum caps that were pressed into the ends of the pipe and bolted together. The caps extended into the weld area to act as the backing "plate" during welding. A high spindle speed was used with a very low feed-rate of 1.25 inches per minute. The low feed-rate was used primarily to decrease the load on the equipment, since this was a new setup. FIG. 23 is a cutaway view of a circumferential lap joint, showing the weld direction 61, the joint surfaces 62, and the tool position 63 bounded by the dotted lines.

ABS Circumferential Lap Joint

ABS was successfully welded together in this configuration. The resulting weld had a poor surface finish, but the weld was strong with few voids. It was more difficult to contain the material in the weld area in this configuration. It is expected that a more effective shoe design to accommodate the particular shape of the parts and weld would improve the weld appearance and eliminate the voids in the weld.

PVC Circumferential Lap Joint

This was the first time PVC was welded using this process and the results were promising. During the first weld, the spindle speed was set to 1200 rpm and the shoe was heated to 360° F. Unfortunately, the surface of the resulting weld was terrible and it appeared that the material did not reconsolidate. However, when the weld was cut apart, the weld material below the surface of the weld looked very good and consolidated. A second weld was made with a higher spindle speed (1600 rpm) and shoe temperature (380° F.), but this resulted in serious degradation of the weld material. The pin must have heated the material too much, because the entire weld was degraded. The first run however, resulted in a strong and well consolidated, though unattractive, weld.

Summary of Examples

The results of the above examples results showed friction stir welding of plastics by means of the present invention to be an effective method for joining plastics. Welds made with the present method exhibit mechanical properties in excess of 75% of the base material properties. This is close to the values of many common methods currently used for joining plastics.

The process appears to be robust because weld performance does not decrease significantly if the process setup is not perfect. For example, improper tool depth, improper pin/joint alignment, and other minor factors do not significantly affect the weld.

Despite the robust nature of friction stir welding, the process parameters have a large influence on weld quality. As shown by the tensile and flexural test results, the most important process parameter associated with friction stir welding plastics is the spindle speed. A higher spindle speed increases the modulus of the weld material by at least 5000 psi. 1000 rpm appeared to be the optimal spindle speed, while spindle speeds above 1400 rpm seem to generate too much heat and degrade the base material. Even high temperature plastics, such as Teflon, degraded with spindle speeds above 1400 rpm. Variations in the machine feed rate do not have a significant effect on weld quality. Therefore, the feed should be run at a high level (12 ipm) thereby minimizing the weld time.

Friction stir welding does not require high cost, specialized equipment except in specialized applications. The welding tool itself, however, requires proper design and consideration in order to achieve quality welds. It is apparent that the pin shape (straight, threaded) and the introduction of heat, for example through the tool surface that contacts the top surface of the joint (stationary heated shoe) are critical aspects of the tool design.

The tool pin has a critical role in the welding process because it determines the heating and flow of the softened material. Shearing structures, such as threads on the pin greatly improve the effectiveness of the pin for two reasons.

1. The structures shear the material in the joint as the pin rotates and advances through the material. Shearing adds more energy to the joint area, thus melting the material faster and more efficiently. The screw in an injection molding machine operates on this same principle, relying on heaters and the shear forces of the screw to input enough energy to melt the plastic. Tools with smooth pins do not heat the joint sufficiently as the pin advances, applying excessive force on the materials which cause the material to blush and crack.

2. If the structures are threads, they also direct the melted material to the bottom of the weld, inhibiting the tendency of the material to leave the weld area. Again, like an injection molding screw, the threads direct the flow of the melted plastic. The threads in the tool pin serve the opposite function of the flutes in a drill. Instead of pulling the material up and away from the base material as in drilling, the threads of the tool pin direct the material to the bottom of the joint, keeping the melted material from escaping from the joint area. For example, with a right-hand thread, the pin must be rotated counter-clockwise to direct the material to the bottom of the weld. Non-threaded tools have no way of containing the melted material, even when the heated shoe design is used.

The tool pin length is also an important design consideration. Pins with a length to diameter ratio of 2:1 or greater, experienced rapid cyclic fatiguing from the high side loads placed on them, thus shortening tool life. To avoid this problem, tools should be designed with the shortest pin possible. Shoe design has a direct effect on this dimension because the pin must pass through the shoe. Therefore, the shoe should be thin in the area where the pin passes through it to allow for a short pin.

Figure 24:
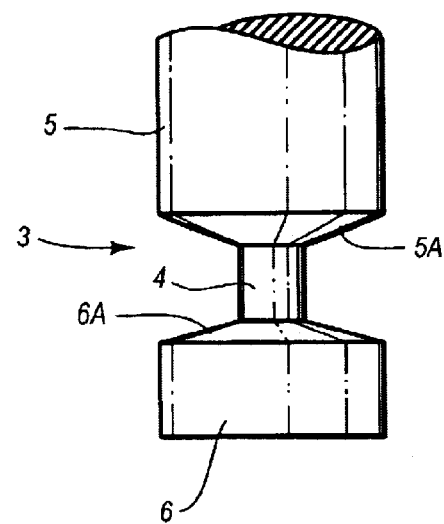
FIG. 24 is a schematic of a bobbin-type rotating tool.

The preferred configuration of the rotating pin is preferably a tapered pin with the required textured surface, as illustrated in the Examples. However, other configurations are contemplated to meet thermoplastic properties and weld configurations. For example, a so-called bobbin tool, such as illustrated in FIG. 24 may also be used in the practice of the invention. Such a tool 3 has a narrow cylindrical portion 4, which is brought to an edge of the material to be welded, pushed or plunged into the material, and traversed through the material. The narrow cylindrical portion 4, is between upper and lower section 5,6. The upper and lower sections 5A, 6A bear against the upper and lower shoes, 7, 8, which are used to constrain the material in the weld region.

If the shoe is used to transfer heat to the weld area, the shoe itself must be made of a heat conducting material so it can transfer heat. Shoe geometry may vary to meet the needs of the material being welded. In particular the contact area between the shoe and weld surface must be properly shaped and large enough to cover the entire weld in order to contain the melted plastic and assist in reconsolidation of the plastic material in the weld. If the weld material is not contained, material will be lost from the weld area, resulting in voids in the weld. Resistive heating effectively heated the shoe, allowing the shoe to smooth the top of the weld, but other method of heating are contemplated.

General Conclusions

Friction stir welding according to the invention is a feasible method for joining plastics, capable of making consistent, high quality welds. It has been found that several key process parameters and elements of the tool design that must be understood to effectively weld plastic materials with this process. From this investigation, the following conclusions can be made:

1. The machine spindle speed, the rotational speed of the pin, is a significant process parameter. The speed must be sufficient to introduce sufficient frictional and shear energy into the plastic material, to melt the material in contact with the pin. Considering the spindle speed and tool diameter, a better explanation may be that the surface speed of the tool pin significantly affects the resulting weld strength. A higher surface speed results in more energy input due to increased shearing from the tool protuberance and increased frictional heating from the tool surfaces in contact with the material. Higher energy input appears to encourage better fusion between the melted weld and base materials.

2. While the risk of degrading the plastic during friction stir welding is lower than in many other processes, high spindle speeds, when used with low feedrates, have the potential to degrade the base material. At moderate spindle speeds, the risk of degradation appears to be minimal. This is because the energy inputted into the weld area is not strictly energy from heat. The frictional and shearing forces also help break up the bonds between molecules as the tool advances through the weld area, requiring less heating which discourages degradation.

3. Tensile and flexural testing indicate that welds produced in plastics by friction stir welding exhibit tensile and flexural moduli at least 75% of the base material, without a significant reduction in impact energy.

4. Optimal process parameters for friction stir welding ABS plastics, i.e. for creating a weld with high tensile and flexural moduli, are as follows:

Spindle Speed:>>1000 rpm

Machine Feed rate:<12 inches per minute

Tool Pin Diameter: Straight

This conclusion is supported by the fact that the specimens with the lowest average mechanical properties were welded with the low spindle speed at the high feed rate, and with a tapered pin.

While the lower machine feed rate results in slightly stronger welds, the difference in strength may not be enough to justify running the process at the lower feed rate. Sufficiently strong welds could most likely be made at a much higher feed rate, for many applications.

5. The optimal friction stir welding tool incorporates a threaded tool pin and a heated shoe. Together, the shoe and threaded pin contain the melted plastic in the weld area, thus improving the mechanical properties of the weld. Without a threaded pin and shoe, material is lost and large voids form in the weld. Voids dramatically decrease the mechanical properties of the welds.

6. Friction stir welding methods can be used to join several types of thermoplastic materials. A wide variety of materials have been successfully welded using FSW.

7. Significant differences exist between friction stir welding plastics according to the invention and aluminum through prior-art methods. First, plastics require a non-rotating shoe (preferably heated) to retain the material in the weld area. Second, the head of the mill must be perpendicular to the backing plate when welding plastic, instead of angled as is the case with aluminum; Third, when friction stir welding plastics, the base material is actually melted, whereas the material is softened, not melted when welding aluminum. Fourth, the pressure in the vertical direction influences the two materials differently. With aluminum, the downward pressure forges the material, increasing weld strength. Therefore, this pressure is beneficial when welding aluminum. With plastic however, this same pressure causes problem due to the viscoelastic nature of plastic. Because of this pressure, the material in the weld area expands after the pressure from the hot shoe is removed. This often results in a pronounced weld "bead." While this does not seem to affect the mechanical properties of the weld, it does affect the appearance of the weld.

Welds made using friction stir welding according to the present invention have strengths of at least 75% of the strength of the base material. This high strength is almost as good as, if not better than, most of the methods commonly used to join plastics. Friction stir welded joints are especially effective in bending. Unlike most other processes, there is a very low risk of degradation associated with friction stir welding because of the low temperatures used to join the materials.

The present invention is also expected to be economically feasible, mainly because of its moderate machine costs, very low tooling costs, and ease of automation. When compared with hot plate welding, which is a common process and is used in comparable applications as that of the present invention, the present invention compared favorably. The joints produced with hot plate welding are similar in strength, applications, and geometry to those produced using FSW. Both processes can be used for both low and high technology applications and can join small and large parts. In general, their applications are similar enough to justify this comparison. The comparison, summarized in Table IX, was based on the cost and time requirements for joining two 4"×10" pieces of 0.25" thick ABS sheet in a butt joint.

TABLE IX

Comparison of hot plate and FSW

| Process | Machine Cost | Tooling Cost | Maintenance high/low | Operator Skill Level | Automate? Yes/No | Weld Time |
|---|---|---|---|---|---|---|
| Hot Plate | $60,000 | $20,000 | Low | Low | Yes: difficult | 10 sec. |
| FSW | $40,000 | $40 | Low | Low | Yes: easy | 60 sec. |

Figure 25:
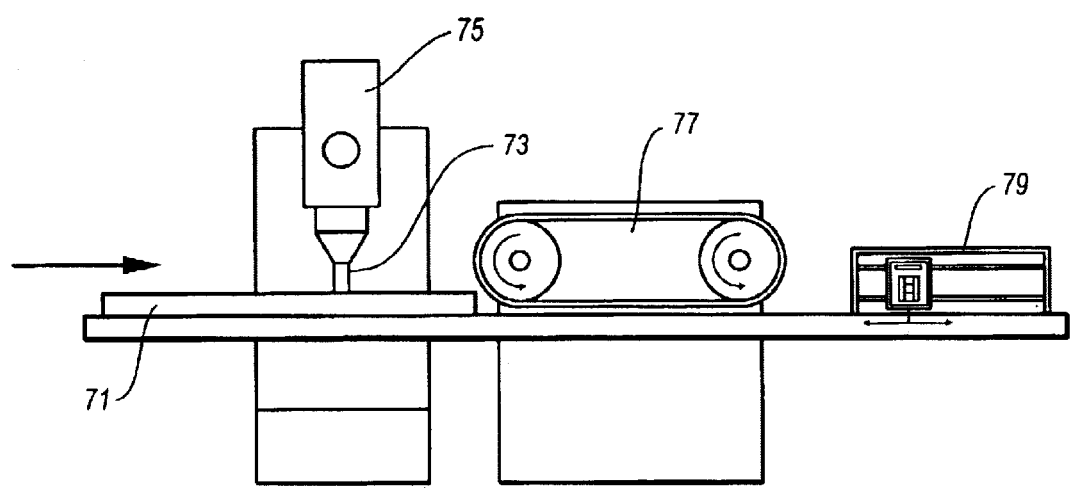
FIG. 25 is a schematic of a possible automated friction stir welding process layout.
Figures 1, 26A:
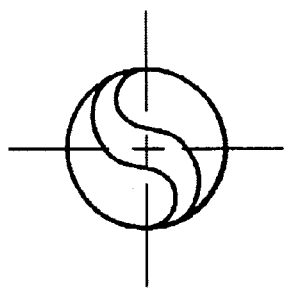
Figures 5, 26A:
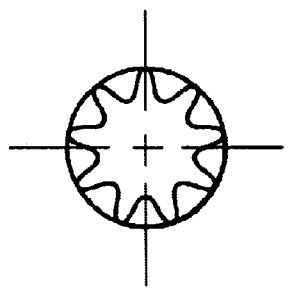
Figures 9, 26A:
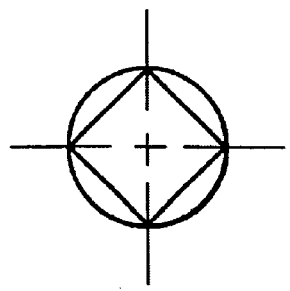
Figures 2, 26A:
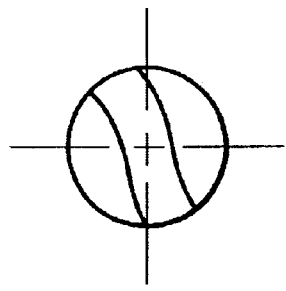
Figures 6, 26A:
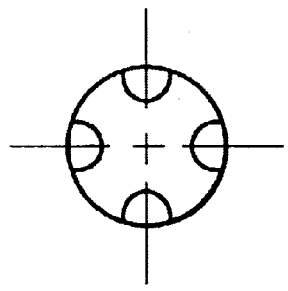
Figures 10, 26A:
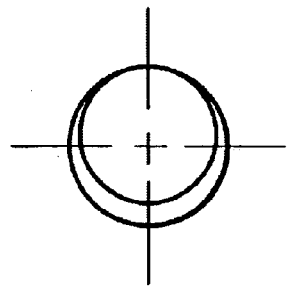
Figures 3, 26A:
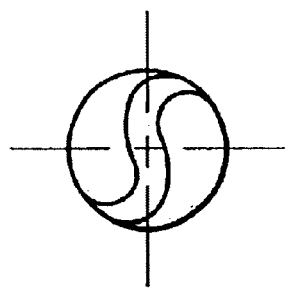
Figures 7, 26A:
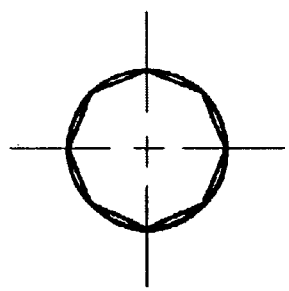
Figures 11, 26A:
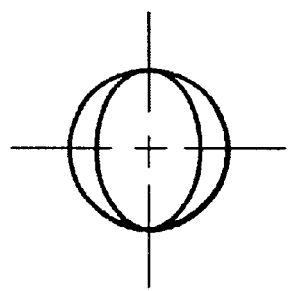
Figures 4, 26A:
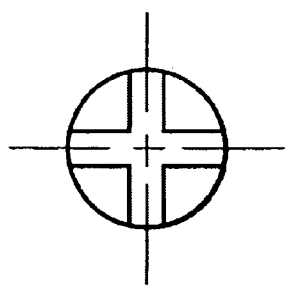
Figures 8, 26A:
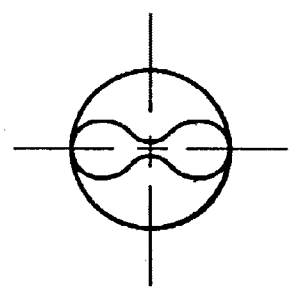
Figures 12, 26A:
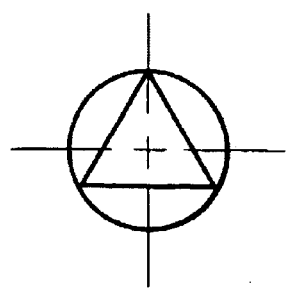
Figures 1, 26B:
Figures 5, 26B:
Figures 8, 262:
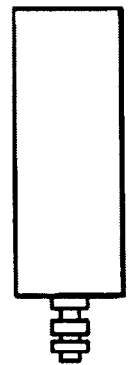
Figures 11, 26B:
Figures 2, 26B:
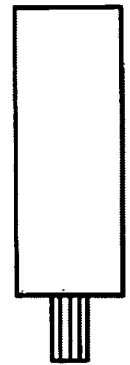
Figures 6, 26B:
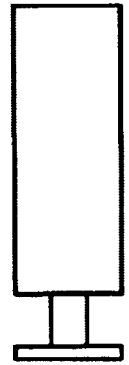
Figures 9, 26B:
Figures 12, 26B:
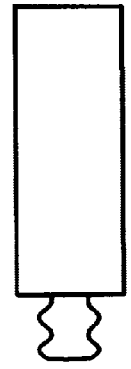
Figures 3, 26B:
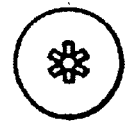
Figures 4, 26B:
Figures 7, 26B:
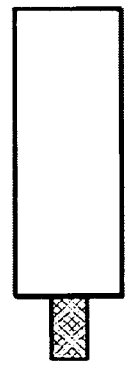
Figures 10, 26B:
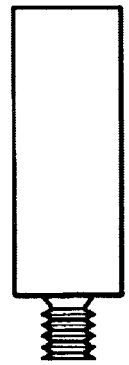
Figures 13, 26B:
Figures 1, 26C:
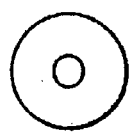
Figures 4, 26C:
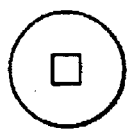
Figures 7, 26C:
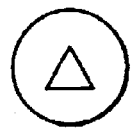
Figures 11, 26C:
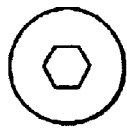
Figures 2, 26C:
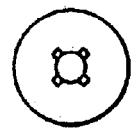
Figures 5, 26C:
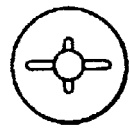
Figures 8, 26C:
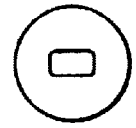
Figures 12, 26C:
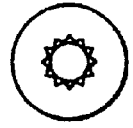
Figures 3, 26C:
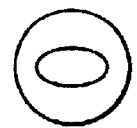
Figures 6, 26C:
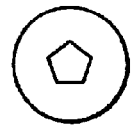
Figures 9, 26C:
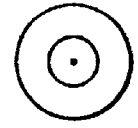
Figures 13, 26C:
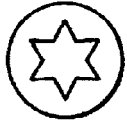
Figures 10, 26C:
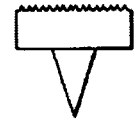
Figure 27A:
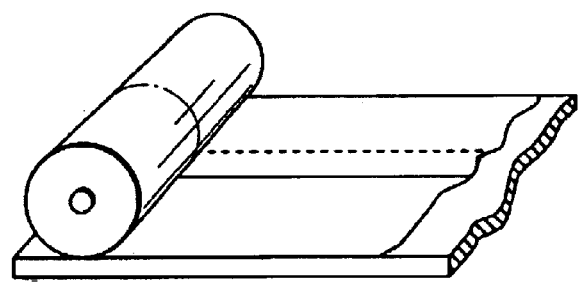
Figure 27B:
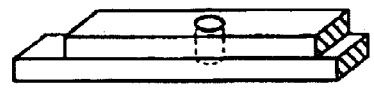
Figures 1, 27C:
Figures 3, 27C:
Figures 5, 27C:
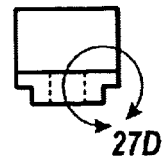
Figures 2, 27C:
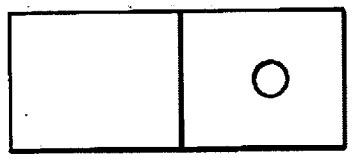
Figures 4, 27C:
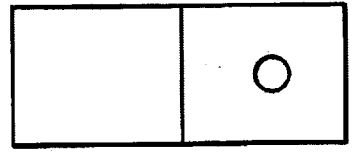
Figures 1, 27D:
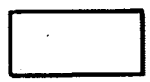
Figures 2, 27D:
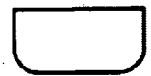
Figures 3, 27D:
Figures 4, 27D:
Figures 1, 27E:
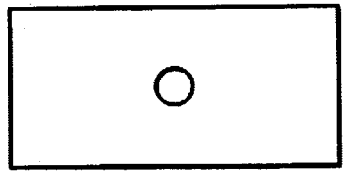
Figures 3, 27E:
Figures 2, 27E:
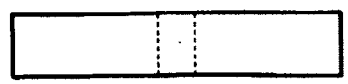

From this data, friction stir welding appears to be a competitive and effective method for joining plastics. It offers a lower machine and tooling cost. The shorter weld time associated with hot plate welding is almost entirely offset by the time required for loading and unloading parts in the hot plate welding machine. (The weld time for FSW was determined using a feed rate of 10 inches per minute.) FSW also offers several other advantages. The machine used for the FSW process can be much smaller than the bulky hot plate welding machine. A hot plate welder large enough to join these pieces would be 6' wide, 3' deep, and 4' tall. The FSW process could also be set up to be a continuous, automated process. FIG. 25 is a possible automated friction stir welding line. The diagram shows a thermoplastic material in a guide/clamping fence 71, with the material traveling in the direction show by the arrow. A friction stir tool 73 mounted in a mill 75 is provided. A caterpillar material puller 77 is used to move the material under the mill, and a cutoff saw 79 is used to cut the fabricated pieces to predetermined length. By attaching a CNC programming module, different part geometries could be addressed simply by programming in a new tool path instead of having to retool the machine. This is a big advantage over hot plate welding.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A method for welding thermoplastic material comprising;
    rotating an element and directing the rotating element into a thermoplastic material and advancing the rotating element along a path in thermoplastic material where a weld is to be formed, the element having a geometry, and rotated at a speed and advanced at a rate relative to the thermoplastic material such that the rotation of the element against the thermoplastic material introduces frictional energy into thermoplastic material in a weld forming region sufficient to heat the thermoplastic material in the weld forming region to a temperature to fuse thermoplastic material,
    constraining the thermoplastic material in the weld forming region with a constraining surface directed along the path that has a motion independent of rotating motion of the rotating element, such that the independent motion and construction of the constraining surface inhibit expulsion of heated thermoplastic material from the weld forming region resulting from the rotation and advancement of the element, inhibit lateral forces induced in the rotating element from the constraining surface, assist in consolidation thermoplastic material that is heated and fused.

2. A method for welding thermoplastic material comprising;
    rotating an element and directing the rotating element into a thermoplastic material and advancing the rotating element along a path in thermoplastic material where a weld is to be formed, the element having a geometry, and rotated at a speed and advanced at a rate relative to the thermoplastic material where the rotation of the element against the thermoplastic material introduces frictional energy into thermoplastic material in a weld forming region,
    introducing thermal energy into at least a portion of the weld forming region where the frictional energy and the thermal energy are sufficient to heat the thermoplastic material to a temperature to fuse the thermoplastic material in the weld forming region,
    constraining the thermoplastic material in the weld forming region with a constraining surface directed along the path that has a motion independent of rotating motion of the rotating element, such that the independent motion and construction of the constraining surface inhibit expulsion of heated thermoplastic material from the weld forming region resulting from the rotation and advancement of the element, inhibit lateral forces induced in the rotating element from the constraining surface, assist in consolidation thermoplastic material that is heated and fused.

3. The method of claim 2 wherein the thermal energy is introduced through structure comprising a portion the constraining surface and a generator of thermal energy.

4. The method of claim 2 wherein the thermal energy is introduced through structure comprising the rotating element and a generator of thermal energy.

5. The method of claim 1 where the constraining surface is in at least in part insulated to reduce the dissipation of the heat from the weld region.

6. The method of claim 2 where the constraining surface is in at least in part insulated to reduce the dissipation of the heat from the weld region.

7. The method of claim 2 wherein the generator of thermal energy comprises an inductive heater, resistance heater, a gas flame, fluid heat exchanger with a heated fluid, a sonic generator, a chemical reaction, or a combination of the above.

8. The method of claim 2 wherein the thermal energy is introduced by directing a heated gas at the weld forming region.

9. The method of claim 2 wherein the thermal energy is introduced by introducing mechanical energy into the weld forming region.

10. The method of claim 2 wherein the thermal energy is introduced by introducing electromagnetic energy into the weld forming region.

11. The method of claim 10 wherein the thermal energy is introduced by energy source comprising ultraviolet light, infrared light, microwave, plasma, electron beam, or combination of the above.

12. The method of claim 1 additionally comprising removing thermal energy from a portion of the weld forming region to control the temperature of the heated thermoplastic material or assist in consolidation of the heated and fused thermoplastic material.

13. The method of claim 12 wherein thermal energy is removed by cooling the rotating element.

14. The method of claim 12 wherein thermal energy is removed by cooling at least a portion of the constraining surface.

15. The method of claim 1 wherein additional to rotating the element, moving the element in a non-rotating movement that produces frictional energy in addition to that produced from the rotating of the element and the advancing of the element along the path.

16. The method of claim 15 wherein the non-rotating movement is vibration, oscillation, eccentric rotation, expansion, contraction, or a combination of the above.

17. The method of claim 1 wherein the constraining surface is non-rotating with respect to the thermoplastic material.

18. The method of claim 1 wherein the constraining surface rotates in the same direction as the rotating element on the same or different axis of rotation.

19. The method of claim 1 wherein the constraining surface rotates in the opposite direction from the rotating element on the same or different axis of rotation.

20. The method of claim 1 wherein the constraining surface rotates on an axis not parallel to the axis of rotation of the element.

21. The method of claim 1 wherein the constraining surface rotates on an axis not parallel to the axis of rotation of the element and is structured to roll a surface over a portion of the weld forming region.

22. The method of claim 1 wherein the constraining surface is shaped to control the finish of the weld.

23. The method of claim 1 wherein the constraining surface comprises a surface that is flat.

24. The method of claim 1 wherein the constraining surface comprises a surface that is not flat.

25. The method of claim 1 wherein the constraining surface comprises a surface that is cylindrically or spherically concave or convex.

26. The method of claim 1 wherein the geometry of the element comprises structure to control the flow of the heated thermoplastic material to inhibit expulsion of the thermoplastic material from the weld forming region.

27. The method of claim 1 wherein the geometry of the element comprises structure to control the flow of the heated thermoplastic material to assist in consolidation thermoplastic material.

28. The method of claim 1 wherein the geometry of the element comprises threads.

29. The method of claim 1 wherein the geometry of the element comprises a circular cross-section of the element.

30. The method of claim 1 wherein the geometry of the element comprises a non-circular cross-section of the element.

31. The method of claim 30 wherein the non-circular cross-section is any non-circular closed shape that functions to induce friction from the rotating of the element, as opposed to cutting the thermoplastic material.

32. The method of claim 30 wherein the non-circular cross-section is polygonal, star-shaped, lobed, dumb-bell-shaped, ovoid, bladed, s-shaped, crossed, or a combination thereof.

33. The method of claim 1 wherein the geometry of the element comprises variation of cross-sectional shape of the element along an axis of rotation.

34. An apparatus of welding thermoplastic material which comprises;
a rotating element with apparatus for advancing the rotating element into a thermoplastic material and directing the rotating element along an path in thermoplastic material where a welded joint is to be formed to introduce frictional energy into a weld forming region in the thermoplastic material by rotation of the element against the thermoplastic material sufficient to heat the thermoplastic material in the weld forming region to a temperature to fuse the thermoplastic material, the rotating element having a geometry that contributes to the frictional energy introduced into the weld,
constraining surface constructed to be directed along the path that has construction for a motion independent of rotating motion of the rotating element, such that the independent motion and the construction of the constraining surface inhibit expulsion of heated thermoplastic material from the weld forming region resulting from the rotation and advancement of the element, inhibit lateral forces induced in the rotating element from the constraining surface, assist in consolidation thermoplastic material that is heated and fused.

35. The apparatus of claim 34 additionally comprising an energy source for introducing thermal energy into at least a portion of the weld forming region in addition to the frictional energy.

36. An apparatus of welding thermoplastic material which comprises;
a rotating element with apparatus for advancing the rotating element into a thermoplastic material and directing the rotating element along an path in thermoplastic material where a welded joint is to be formed to introduce frictional energy into a weld forming region in the thermoplastic material by rotation of the element against the thermoplastic material, the rotating element having a geometry that contributes to the frictional energy introduced into the weld,
an energy source for introducing thermal energy into at least a portion of the weld forming region in addition to the frictional energy, the frictional energy and the thermal energy sufficient to heat the thermoplastic material in the weld forming region to a temperature to fuse the thermoplastic material,
constraining surface constructed to be directed along the path that has construction for a motion independent of rotating motion of the rotating element, such that the independent motion and the construction of the constraining surface inhibit expulsion of heated thermoplastic material from the weld forming region resulting from the rotation and advancement of the element, inhibit lateral forces induced in the rotating element from the constraining surface, assist in consolidation thermoplastic material that is heated and fused.

37. The apparatus of claim 36 wherein the thermal energy source comprises a portion the constraining surface and a generator of thermal energy where the thermal energy is generated by the generator and introduced through the constraining surface.

38. The apparatus of claim 36 wherein the thermal energy source comprises the rotating element and a generator of thermal energy where thermal energy is generated by the generator and introduced through the rotating element.

39. The apparatus of claim 36 wherein the generator of thermal energy comprises an inductive heater, resistance heater, a gas flame, fluid heat exchanger with a heated fluid, a sonic generator, a chemical reaction, or a combination of the above.

40. The apparatus of claim 36 wherein the source of thermal energy comprises a heated gas stream directed at the weld forming region.

41. The apparatus of claim 36 wherein the thermal energy source is a system for introducing mechanical energy into the weld forming region.

42. The apparatus of claim 36 wherein the thermal energy source is a system for introducing electromagnetic energy into the weld forming region.

43. The apparatus of claim 36 wherein the thermal energy source is a system that comprises ultraviolet light, infrared light, microwave, plasma, electron beam, or combination of the above.

44. The apparatus of claim 34 additionally comprising structure for removing thermal energy from a portion of the weld forming region to control the temperature of the heated thermoplastic material or assist in consolidation of the heated and fused thermoplastic material.

45. The apparatus of claim 44 wherein structure for removing thermal energy comprises structure for cooling the rotating element.

46. The apparatus of claim 44 wherein thermal energy for removing thermal energy comprises structure for cooling at least a portion of the constraining surface.

47. The apparatus of claim 34 additional comprising structure for moving the element in a non-rotating movement that produces frictional energy in addition to that produced from the rotating of the element and the advancing of the element along the path.

48. The apparatus of claim 47 wherein the non-rotating movement is vibration, oscillation, eccentric rotation, expansion, contraction, or a combination of the above.

49. The apparatus of claim 34 wherein the constraining surface is non-rotating with respect to the thermoplastic material.

50. The apparatus of claim 34 wherein the constraining surface rotates in the same direction as the rotating element on the same or different axis of rotation.

51. The apparatus of claim 34 wherein the constraining surface rotates in the opposite direction from the rotating element on the same or different axis of rotation.

52. The apparatus of claim 34 wherein the constraining surface rotates on an axis not parallel to the axis of rotation of the element.

53. The apparatus of claim 34 wherein the constraining surface rotates on an axis not parallel to the axis of rotation of the element and comprises a roller to roll a surface over a portion of the weld forming region.

54. The apparatus of claim 34 wherein the constraining surface is shaped to control the finish of the weld.

55. The apparatus of claim 34 wherein the constraining surface comprises a surface that is flat.

56. The apparatus of claim 34 wherein the constraining surface comprises a surface that is not flat.

57. The apparatus of claim 34 wherein the constraining surface comprises a surface that is cylindrically or spherically concave or convex.

58. The apparatus of claim 34 wherein the geometry of the element comprises structure to control the flow of the heated thermoplastic material to inhibit expulsion of the thermoplastic material from the weld forming region.

59. The apparatus of claim 34 wherein the geometry of the element comprises structure to control the flow of the heated thermoplastic material to assist in consolidation thermoplastic material.

60. The apparatus of claim 34 wherein the geometry of the element comprises threads.

61. The apparatus of claim 34 wherein the geometry of the element comprises a circular cross-section of the element.

62. The apparatus of claim 34 wherein the geometry of the element comprises a non-circular cross-section of at least a portion of the element.

63. The apparatus of claim 62 wherein the non-circular cross-section is any non-circular closed shape that functions to induce friction from the rotating of the element, as opposed to cutting the thermoplastic material.

64. The apparatus of claim 62 wherein the non-circular cross-section is polygonal, star-shaped, lobed, dumb-bell-shaped, ovoid, bladed, s-shaped, crossed, or a combination thereof.

65. The apparatus of claim 34 wherein the geometry of the element comprises variation of cross-sectional shape of the element along an axis of rotation.

\* \* \* \* \*